(12) United States Patent
Yoshino et al.

(10) Patent No.: US 12,290,828 B2
(45) Date of Patent: May 6, 2025

(54) COATING SYSTEM AND COATING METHOD

(71) Applicant: KABUSHIKI KAISHA YASKAWA DENKI, Kitakyushu (JP)

(72) Inventors: Katsuhiko Yoshino, Kitakyushu (JP); Naoyuki Ohtsubo, Kitakyushu (JP); Yasuhiro Kataoka, Kitakyushu (JP); Kenichiro Shigeyoshi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 249 days.

(21) Appl. No.: 17/941,023

(22) Filed: Sep. 9, 2022

(65) Prior Publication Data

US 2023/0097222 A1 Mar. 30, 2023

(30) Foreign Application Priority Data

Sep. 29, 2021 (JP) .................... 2021-158911

(51) Int. Cl.
| | | |
|---|---|---|
| *B05B 13/04* | (2006.01) | |
| *B05B 13/02* | (2006.01) | |
| *B05D 7/14* | (2006.01) | |
| *B25J 11/00* | (2006.01) | |

(52) U.S. Cl.
CPC ...... *B05B 13/0431* (2013.01); *B05B 13/0221* (2013.01); *B05B 13/0452* (2013.01); *B05D 7/14* (2013.01); *B25J 11/0075* (2013.01)

(58) Field of Classification Search
None
See application file for complete search history.

(56) References Cited

U.S. PATENT DOCUMENTS

| | | | |
|---|---|---|---|
| 2006/0292308 A1* | 12/2006 | Clifford | B05B 13/0452 427/427.2 |
| 2009/0304940 A1* | 12/2009 | Heldt | B25J 9/0084 427/427.2 |
| 2012/0260854 A1 | 10/2012 | Takebe et al. | |
| 2018/0221904 A1* | 8/2018 | Yoshino | B25J 9/042 |
| 2021/0146393 A1 | 5/2021 | Yoshino et al. | |

FOREIGN PATENT DOCUMENTS

| | | |
|---|---|---|
| JP | S61-25210 | 2/1986 |
| JP | H02-75369 | 3/1990 |
| JP | H08-58649 | 3/1996 |

(Continued)

OTHER PUBLICATIONS

Japanese Office Action for corresponding JP Application No. 2021-158911, Apr. 7, 2023 (w/ English machine translation).

(Continued)

*Primary Examiner* — Alexander M Weddle
(74) *Attorney, Agent, or Firm* — MORI & WARD, LLP

(57) ABSTRACT

A coating system includes a first robot configured to open an opening/closing portion of a vehicle body and a second robot configured to coat an interior of the vehicle body through the opening/closing portion opened by the first robot. The first robot has a first base via which the first robot is mounted to a structure forming a coating area. The second robot has a second base via which the second robot is mounted. The second base is mounted below the first base in a vertical direction.

21 Claims, 17 Drawing Sheets

(56) References Cited

FOREIGN PATENT DOCUMENTS

| | | |
|---|---|---|
| JP | 2013-31890 | 2/2013 |
| JP | 2018-126831 | 8/2018 |
| WO | WO 2011/055766 | 5/2011 |

OTHER PUBLICATIONS

Chinese Office Action for corresponding CN Application No. 202211191380.2, Mar. 20, 2024 (w/ English machine translation).
Chinese Office Action for corresponding CN Application No. 202211191380.2, Aug. 20, 2024 (w/ English machine translation).

* cited by examiner

COATING SYSTEM AND COATING METHOD

CROSS-REFERENCE TO RELATED APPLICATIONS

The present application claims priority under 35 U.S.C. 517 119 to Japanese Patent Application No. 2021-158911, filed Sep. 29, 2021. The contents of this application are incorporated herein by reference in their entirety.

BACKGROUND OF THE INVENTION

Field of the Invention

Disclosed embodiments relate to a coating system and a coating method.

Discussion of the Background

Japanese Unexamined Patent Publication No. 2013-31890 describes a coating system including a coating robot for coating the inside of a door of a vehicle body and a door opening/closing robot for opening/closing the door of the vehicle body and maintaining the open state of the door. In this coating system, the door opening/closing robot is installed at a position lower than the coating robot in a height direction.

SUMMARY OF THE INVENTION

According to one aspect of the present invention, a coating system includes a first robot configured to open an opening/closing portion of a vehicle body and a second robot configured to coat an interior of the vehicle body through the opening/closing portion opened by the first robot. The first robot has a first base via which the first robot is mounted to a structure forming a coating area. The second robot has a second base via which the second robot is mounted. The second base is mounted below the first base in a vertical direction.

According to another aspect of the present invention, a coating system includes a conveyor configured to convey a vehicle body in a first direction; a first robot configured to open an opening/closing portion provided at a rear of a vehicle body and having a first base via which the first robot is mounted to a structure forming a coating area and which does not move with respect to the structure; a second robot configured to coat an interior of the vehicle body through the opening/closing portion opened by the first robot and having a second base via which the second robot is mounted, the second base being mounted below the first base in a vertical direction; a third robot configured to open a second opening/closing portion provided on a side of the vehicle body and having a third base via which the third robot is mounted to the structure and which does not move with respect to the structure; a fourth robot configured to coat the interior of the vehicle body through the second opening/closing portion opened by the third robot and having a fourth base that is mounted below the third base in the vertical direction; a traveling device including a first slider and a second slider respectively movable along a rail in the first direction; a turning arm connected to the first slider rotatably around a turning axis extending along the vertical direction; the second robot being mounted on the turning arm; and the fourth robot being mounted on the second slider.

According to further aspect of the present invention, a coating method includes conveying a vehicle body with an opening/closing portion in a first direction; controlling a horizontal arm of a first robot so that a vertical arm of the first robot follows the vehicle body, the vertical arm being connected to a tip end of the horizontal arm; opening the opening/closing portion via the vertical arm to maintain an open state; moving a second robot in the first direction and in a second direction intersecting the first direction so as to follow the vehicle body; and coating an interior of the vehicle body with the second robot through the opened opening/closing section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 13 is a flowchart showing an example of a processing procedure executed by a host controller or the like.

DESCRIPTION OF THE EMBODIMENTS

An embodiment will be described below with reference to the drawings. In the following description, directions such as up, down, left, right, front and back may be appropriately used for convenience of explanation of the configuration of the coating system and the like, but the positional relationship of each configuration of the coating system and the like is not limited.

Overall Configuration of Coating System

Figure 1:
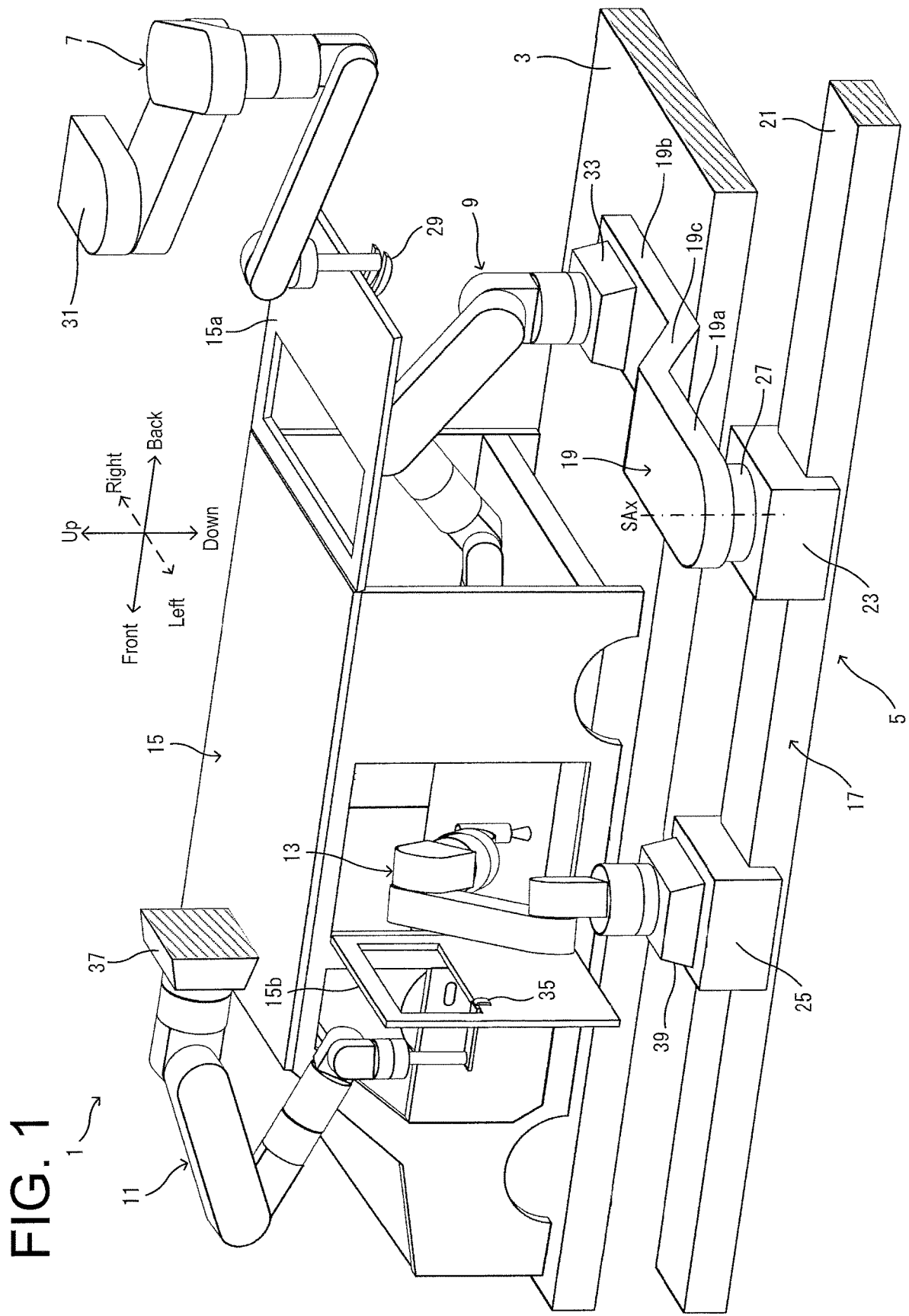
FIG. 1 is a perspective view showing an example of the overall configuration of a coating system according to an embodiment.

Referring to FIG. 1, an example of the overall configuration of a coating system 1 according to the present embodiment will be described.

The coating system 1 is a system that coating is automatically performed by a robot on the inside of a vehicle body 15 conveyed in a coating booth (an example of a coating area, not illustrated). As shown in FIG. 1, the coating system 1 includes a conveyor 3, a moving device 5, a rear-side opening/closing robot 7, a rear-side coating robot 9, a front-side opening/closing robot 11, and a front-side coating robot 13.

The conveyor 3 conveys the vehicle body 15 forwardly in the front-rear direction (an example of the first direction). The conveyor 3 may perform continuous operation in which the vehicle body 15 is continuously conveyed without being stopped, or may perform intermittent operation in which conveyance and stop are repeated. In the present embodiment, a case where the conveyor 3 performs continuous operation will be described as an example. The vehicle body 15 is, for example, a body of an automobile. The vehicle body 15 has, for example, a rear back door 15a and a left side door 15b. The back door 15a (an example of the opening/closing portion) is opened and closed by turning in the vertical direction (vertical direction), and the side door 15b (an example of the opening/closing portion) is opened and closed by turning in the horizontal direction. The vehicle body 15 may be a workpiece other than the body of an automobile as long as it is a workpiece having an opening/closing portion and a coating target inside.

The moving device 5 moves the rear-side coating robot 9 in the front-rear direction and also moves it in a direction crossing the front-rear direction (for example, in a left-right direction perpendicular to the front-rear direction). The moving device 5 has a traveling device 17 and a turning arm 19. The traveling device 17 has a rail 21 arranged in the front-rear direction and two sliders 23, 25. The traveling device 17 causes the two sliders 23, 25 to travel forward and backward along a common rail 21, respectively. The traveling device 17 includes, for example, two actuators (for example, a linear motor or a rotary motor and a feed screw mechanism, not illustrated). As a result, the two sliders 23, 25 are independently moved.

The turning arm 19 is mounted on the slider 23 and moves in the front-rear direction along the rail 21 together with the slider 23. The turning arm 19 turns around a turning axis SAx along the vertical direction by an actuator 27. The actuator 27 includes, for example, a servo motor, an encoder, and a reduction gear. The turning arm 19 has a base 19a, a mounting portion 19b, and a connecting portion 19c. The base 19a is connected to the slider 23, and the rear-side coating robot 9 is mounted on the mounting portion 19b. The connecting portion 19c connects the base 19a and the mounting portion 19b having different height positions.

The rear-side opening/closing robot 7 (an example of the first robot) opens the back door 15a of the vehicle body 15 by using the hook 29. The rear-side opening/closing robot 7 changes the posture so that the hook 29 follows the vehicle body 15 and keeps the back door 15a open. The back door 15a is held in a state of being opened substantially parallel to the horizontal direction, for example. Further, the rear-side opening/closing robot 7 may perform an operation of closing the back door 15a. The rear-side opening/closing robot 7 is disposed above the rear-side coating robot 9. The base 31 (an example of the first base 31) of the rear-side opening/closing robot 7 is provided with a wall or a ceiling (an example of a structure, not illustrated) constituting a coating booth, so that it does not move with respect to the wall or the ceiling. The structure to which the base 31 is fixed is not limited to a wall or a ceiling of the coating booth, but may be, for example, a support or a support wall (including those not connected to the ceiling) provided in the coating booth.

The rear-side coating robot 9 (an example of the second robot) is mounted on the mounting portion 19b of the turning arm 19. The rear-side coating robot 9 is moved in the front-rear direction by the movement of the slider 23 by the traveling device 17, and is moved in the circumferential direction around the turning axis SAx by the turning of the turning arm 19. The circumferential direction includes a front-rear direction and a left-right direction, and is an example of a second direction in which the circumferential direction other than the front-rear direction intersects the first direction. The rear-side coating robot 9 is disposed below the rear-side opening/closing robot 7. The base 33 (an example of the second base) of the rear-side coating robot 9 is disposed below the base 31 of the rear-side opening/closing robot 7 in the vertical direction. The rear-side coating robot 9 accesses the interior of the vehicle body 15 from the rear through the back door 15a opened by the rear-side opening/closing robot 7, and paints the interior of the vehicle body 15. The rear-side coating robot 9 moves following the vehicle body 15 by at least one of the traveling device 17 and the turning arm 19.

The front-side opening/closing robot 11 (an example of a first robot and a third robot) opens the side door 15b of the vehicle body 15 by using the hook 35. The front-side opening/closing robot 11 changes the posture so that the hook 35 follows the vehicle body 15 and keeps the side door 15b open. The side door 15b is held in a state of being opened substantially parallel to the left and right direction, for example. The front-side opening/closing robot 11 may perform an operation of closing the side door 15b. The front-side opening/closing robot 11 is disposed above the front-side coating robot 13. The base 37 (an example of the third base 31) of the front-side opening/closing robot 11 is fixed to a wall or a ceiling (an example of a structure, not illustrated) constituting a coating booth, so that it does not move with respect to the wall or the ceiling. The structure to which the base 37 is fixed is not limited to a wall or a ceiling of the coating booth, but may be, for example, a support or a support wall (including those not connected to the ceiling) provided in the coating booth.

The front-side coating robot 13 (an example of the second robot and the fourth robot) is mounted on the slider 25. The front coating robot 13 is moved in the front-rear direction by the movement of the slider 25 by the traveling device 17. The front coating robot 13 is disposed below the front-side opening/closing robot 11. The base 39 of the front-side coating robot 13 (an example of the fourth base 31) is disposed below the base 37 of the front-side opening/closing robot 11 in the vertical direction. The front-side coating robot 13 accesses the inside of the vehicle body 15 from the left side through the side door 15b opened by the front-side opening/closing robot 11, and paints the inside of the vehicle body 15. The front coating robot 13 is moved by the traveling device 17 following the vehicle body 15.

The above-described configuration of the coating system 1 is an example, and is not limited to the above-described configuration. For example, instead of the turning arm 19, a traveling device 17 which can be moved in the left-right direction by rails and sliders may be installed so that the rear-side coating robot 9 can be moved in the front-rear direction and the left-right direction. In addition, the coating may be performed not in a coating booth having a wall or a ceiling but in a coating area (coating space) having no such partition. In this case, the rear-side opening/closing robot 7 and the front-side opening/closing robot 11 may be fixed to a support or the like (an example of a structure) installed in the coating area.

2. Configuration of Rear-Side Opening/Closing Robot

An example of the configuration of the rear-side opening/closing robot 7 will be described with reference to FIG. 2.

Figure 2:
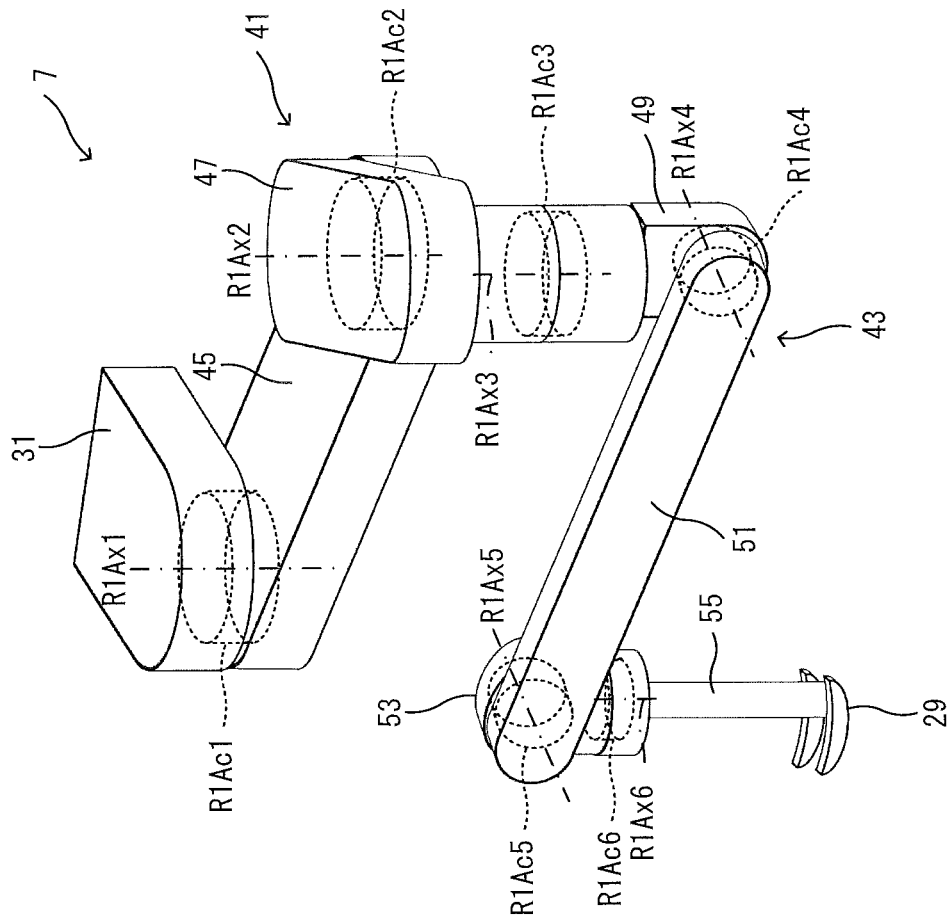
FIG. 2 is a perspective view showing an example of the configuration of the rear-side opening/closing robot.

As shown in FIG. 2, the rear-side opening/closing robot 7 is a six-axis robot arm having six joint portions including, for example, six actuators R1Ac1 to R1Ac6. The rear-side opening/closing robot 7 has the above-described base 31, a horizontal arm 41 of a horizontal multi joint type, and a vertical arm 43 of a vertical multi joint type. The horizontal arm 41 has a base end and a tip end opposite to the base end. The base end is connected to the first base 31. The vertical arm 43 is connected to the tip end of the horizontal arm 41 and is configured to hold the back door 15a. As described above, the base 31 is fixed to a wall or a ceiling constituting the coating booth.

The horizontal arm 41 has a first arm 45, a second arm 47, and a third arm 49. The first arm 45 (an example of the arm element) is connected to the tip portion of the base 31 so as to be turnable about a rotation axis R1Ax1 extending in the vertical direction. The first arm 45 is driven by the actuator R1Ac1 provided at the joint portion between the first arm 45 and the base 31 so as to turn about the rotation axis R1Ax1 with respect to the tip portion of the base 31.

The second arm 47 (an example of the arm element) is connected to the tip portion of the first arm 45 so as to be turnable about a rotation axis R1Ax2 along the vertical direction. The second arm 47 is driven to turn about the rotation axis R1Ax2 with respect to the tip portion of the first arm 45 by the drive of the actuator R1Ac2 provided at the joint portion between the second arm 47 and the first arm 45.

The third arm 49 (an example of the arm element) is connected below the tip portion of the second arm 47 so as to be rotatable about a rotation axis R1Ax3 along the vertical direction. The third arm 49 is driven to rotate about the rotation axis R1Ax3 with respect to the tip portion of the second arm 47 by the drive of the actuator R1Ac3 provided at the joint portion between the third arm 49 and the second arm 47.

The vertical arm 43 has a fourth arm 51, a fifth arm 53, a sixth arm 55, and the hook 29. The fourth arm 51 (an example of the arm element) is connected to the third arm 49, which is the tip portion of the horizontal arm 41, so as to be turnable about a rotation axis R1Ax4 along the horizontal direction perpendicular to the vertical direction. The fourth arm 51 is driven by the actuator R1Ac4 provided at the joint portion between the fourth arm 51 and the third arm 49 to turn about the rotation axis R1Ax4 with respect to the tip portion of the third arm 49.

The fifth arm 53 (an example of the arm element) is connected to the tip portion of the fourth arm 51 so as to be turnable about a rotation axis R1Ax5 along the horizontal direction. The fifth arm 53 is driven by the actuator R1Ac5 provided at the joint portion between the fifth arm 53 and the fourth arm 51 so as to turn about the rotation axis R1Ax5 with respect to the tip portion of the fourth arm 51.

The sixth arm 55 is connected to the tip end of the fifth arm 53 so as to be rotatable about a rotation axis R1Ax6 perpendicular to the rotation axis R1Ax5. The sixth arm 55 is driven to rotate about the rotation axis R1Ax6 with respect to the tip portion of the fifth arm 53 by the driving of the actuator R1Ac6 provided at the joint portion between the sixth arm 55 and the fifth arm 53. The hook 29 (an example of a holding portion) is attached to the tip portion of the sixth arm 55 to hold the back door 15a.

Each of the first arm 45, the second arm 47, and the fourth arm 51 is a long member extending in the extending direction. For example, the first arm 45 is longer than the second arm 47, and the second arm 47 is longer than the fourth arm 51. As a result, it is possible to increase the follow-up distance of the vertical arm 43 (hook 29) with respect to the vehicle body 15 by the operation of the horizontal arm 41.

Actuators R1Ac1 to R1Ac6 for driving the respective joint portions include, for example, a servo motor, an encoder, a reduction gear, a brake, and the like. In the above description, the rotation about the rotation axis along the longitudinal direction (or extending direction) of the rear-side opening/closing robot 7 is referred to as "rotating", and the rotation about the rotation axis perpendicular to the longitudinal direction (or extending direction) of the rear-side opening/closing robot 7 is referred to as "turning" for distinction.

According to the above-described configuration, each arm constituting the horizontal arm 41 rotates in the horizontal direction. Thus, it is possible to avoid interference with the structure (ceiling, etc.) above the rear-side opening/closing robot 7. Further, the length of the first arm 45 and the second arm 47 constituting the horizontal arm 41 is relatively long. Thus, the operating range of the rear-side opening/closing robot 7 can be secured. Therefore, the moving device of the rear-side opening/closing robot 7 is not necessary. Since it is not necessary to install the moving device, which is a heavy object, on the ceiling or wall of the coating booth, reinforcement of the ceiling or wall can be made unnecessary or simple. In addition, by forming the vertical arm 43 into a vertical multi-joint structure, it becomes possible to operate in multiple directions including the vertical direction, and the degree of freedom of the tip portion can be improved. As a result, the hook 29 can be moved in the vertical direction, so that the back door 15a which opens and closes in the vertical direction can be favorably opened. Further, since the rear-side opening/closing robot 7 is disposed above the rear-side coating robot 9, it is possible to prevent the operating areas of the respective robots from interfering with each other. Therefore, the open state of the back door 15a can be maintained without affecting the coating operation by the rear-side coating robot 9.

The configuration of the rear-side opening/closing robot 7 described above is an example, and is not limited to the above-described configuration. For example, the number of arms of the vertical arm 43 and the number of arms of the horizontal arm 41 may be different from the above-described number, or the robot may be different from the six-axis.

3. Configuration of Rear-Side Coating Robot and Front-Side Coating Robot

Figure 3:
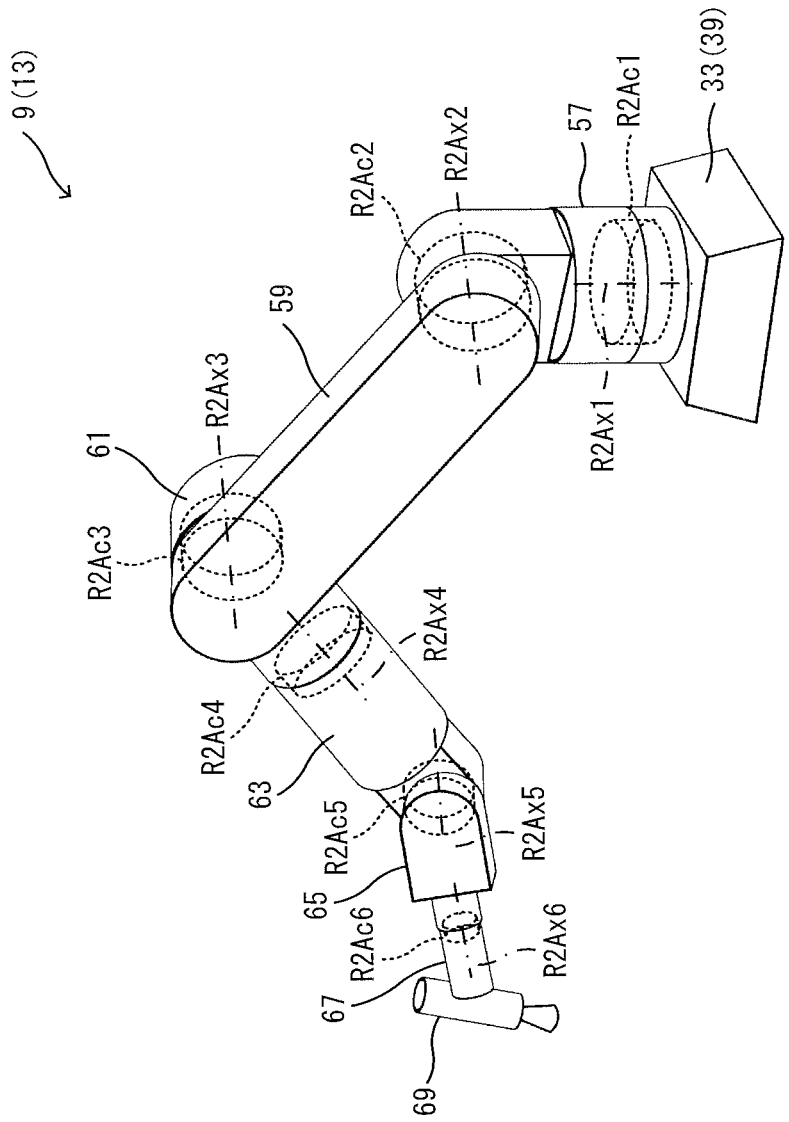
FIG. 3 is a perspective view showing an example of a configuration of a rear-side coating robot and a front-side coating robot.

Referring to FIG. 3, an example of the configuration of the rear-side coating robot 9 and the front-side coating robot 13 will be described. Since the rear-side coating robot 9 and the front-side coating robot 13 have the same configuration, the rear-side coating robot 9 will be described, and the description of the front-side coating robot 13 will be omitted.

As shown in FIG. 3, the rear-side coating robot 9 (similarly to the front-side coating robot 13) is a six-axis robot arm of a vertical multi joint type having six joint portions R2J including, for example, six actuators R2Ac1 to R2Ac6. The rear-side coating robot 9 has the base 33 (base 39 in the front coating robot 13), a turning portion 57, a lower arm 59, an elbow portion 61, an upper arm 63, a wrist portion 65, a flange portion 67, and a coating gun 69.

The turning portion 57 is connected to an upper end portion of the base 33 so as to be rotatable about a rotation axis R2Ax1 parallel to the vertical direction. The turning portion 57 is driven to turn around the rotation axis R2Ax1 with respect to the upper end portion of the base 33 by the driving of the actuator R2Ac1 provided at the joint portion R2J with the base 33.

The lower arm 59 is connected to one side portion (for example, the left side) of the turning portion 57 so as to be able to turn around a rotation axis R2Ax2 perpendicular to the rotation axis R2Ax1. The lower arm 59 is driven by the actuator R2Ac2 provided at the joint portion between the lower arm 59 and the turning portion 57 so as to turn about the rotation axis R2Ax2 with respect to one side of the turning portion 57.

The elbow portion 61 is connected to the other side (for example, the right side) of the tip portion of the lower arm 59 so as to be turnable about a rotation axis R2Ax3 parallel to the rotation axis R2Ax2. The elbow portion 61 is driven by an actuator R2Ac3 provided at the joint portion between the elbow portion 61 and the lower arm 59 to turn around the rotation axis R2Ax3 with respect to the other side of the tip portion of the lower arm 59.

The upper arm 63 is connected to the tip portion of the elbow portion 61 so as to be rotatable about a rotation axis R2Ax4 perpendicular to the rotation axis R2Ax3. The upper arm 63 is driven to rotate about the rotation axis R2Ax4 with respect to the tip portion of the elbow portion 61 by the drive of the actuator R2Ac4 provided at the joint portion between the upper arm 63 and the elbow portion 61.

The wrist portion 65 is connected to the other side (for example, the left side) of the tip portion of the upper arm 63 so as to be turnable about a rotation axis R2Ax5 perpendicular to the rotation axis R2Ax4. The wrist portion 65 is driven to turn about the rotation axis R2Ax5 with respect to the other side of the tip portion of the upper arm 63 by the driving of the actuator R2Ac5 provided at the joint portion between the wrist portion 65 and the upper arm 63.

The flange portion 67 is connected to the tip portion of the wrist portion 65 so as to be rotatable about a rotation axis R2Ax6 perpendicular to the rotation axis R2Ax5. The flange portion 67 is driven to rotate about the rotation axis R2Ax6 with respect to the tip portion of the wrist portion 65 by the drive of the actuator R2Ac6 provided at the joint portion between the flange portion 67 and the wrist portion 65.

The coating gun 69 is attached to the tip of the flange portion 67 at a predetermined angle, and rotates around the rotation axis R2Ax6 together with the rotation of the flange portion 67 around the rotation axis R2Ax6. A hose or the like (not illustrated) for sending a coating material is connected to the coating gun 69.

The actuators R2Ac1 to R2Ac6 for driving the respective joint portions include, for example, a servo motor, an encoder, a reduction gear, and a brake. In the above description, the rotation about the rotation axis along the longitudinal direction (or extending direction) of the rear-side coating robot 9 is referred to as "rotating", and the rotation about the rotation axis perpendicular to the longitudinal direction (or extending direction) of the rear-side coating robot 9 is referred to as "turning".

The configuration of the above-described rear-side coating robot 9 is an example, and is not limited to the above-described configuration. For example, the rear-side coating robot 9 may include an arm other than the above-described respective arms, or a part of the arm may include a horizontal multi-joint structure. Further, a robot other than the six-axis robot may be used.

4. Configuration of Front-Side Opening/Closing Robot

Figure 4:
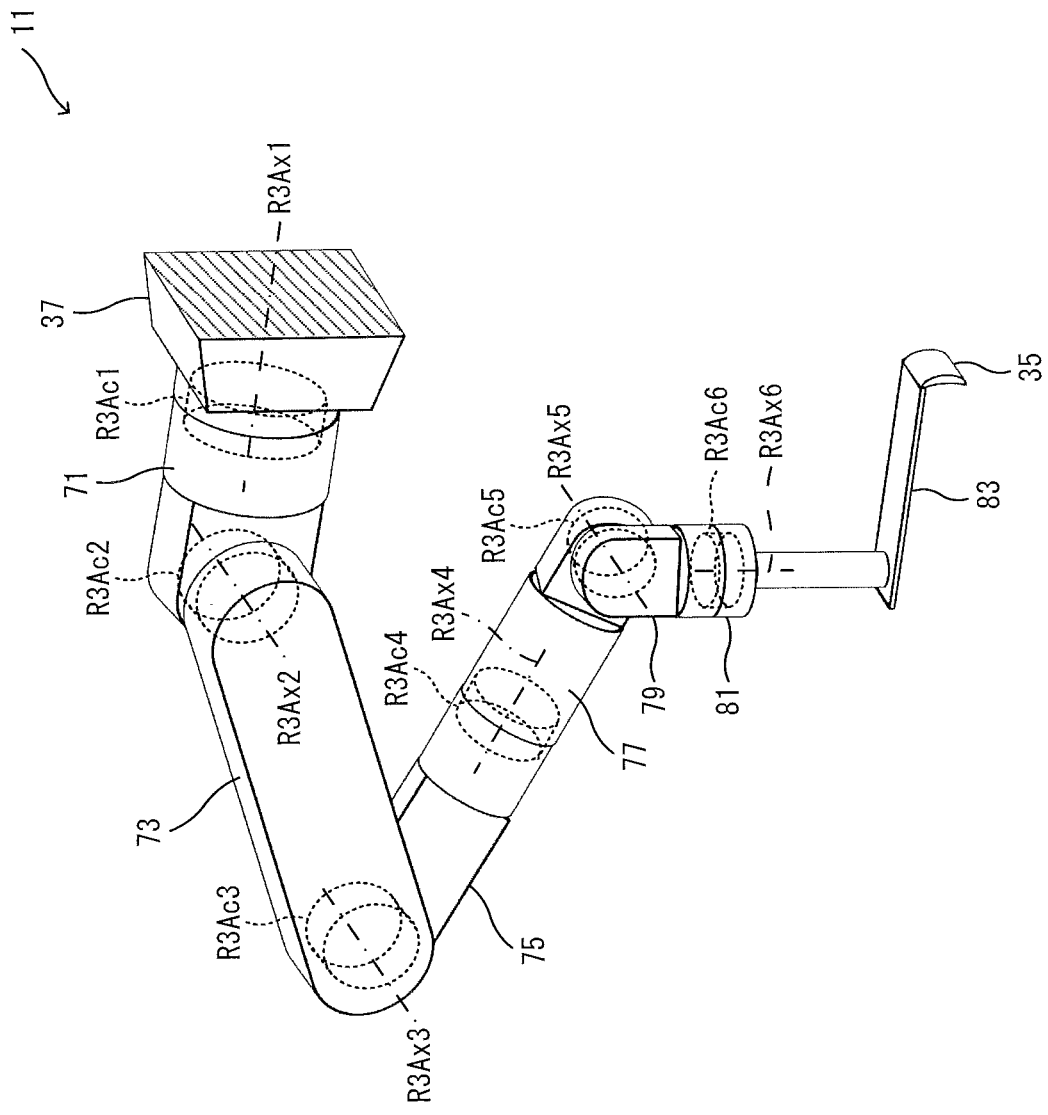
FIG. 4 is a perspective view showing an example of a configuration of a front-side opening/closing robot.

Referring to FIG. 4, an example of the configuration of the front-side opening/closing robot 11 will be described.

As shown in FIG. 4, the front-side opening/closing robot 11 is a six-axis robot arm of a vertical multi joint type having six joint portions R2J including, for example, six actuators R3Ac1 to R3Ac6. The front-side opening/closing robot 11 has the above-described base 37, a turning portion 71, a lower arm 73, an elbow portion 75, an upper arm 77, a wrist portion 79, a flange portion 81, and the above-described hook 35. As described above, the base 37 is fixed to a wall or a ceiling constituting the coating booth.

The turning portion 71 is connected to a tip end portion of the base 37 so as to be rotatable about a rotation axis R3Ax1 along a horizontal direction perpendicular to the vertical direction. The turning portion 71 is driven to turn around the rotation axis R3Ax1 with respect to the front end portion of the base 37 by the driving of the actuator R3Ac1 provided at the joint portion between the turning portion 71 and the base 37.

The lower arm 73 is connected to one side portion (for example, the left side) of the turning portion 71 so as to be able to turn around a rotation axis R3Ax2 perpendicular to the rotation axis R3Ax1. The lower arm 73 is driven by the actuator R3Ac2 provided at the joint portion between the lower arm 73 and the turning portion 71 so as to turn around the rotation axis R3Ax2 with respect to one side of the turning portion 71.

The elbow portion 75 is connected to the other side (for example, the right side) of the tip portion of the lower arm 73 so as to be pivotable about a rotation axis R3Ax3 parallel to the rotation axis R3Ax2. The elbow portion 75 is driven by the actuator R3Ac3 provided at the joint portion between the elbow portion 75 and the lower arm 73 so as to rotate about the rotation axis R3Ax3 with respect to the other side of the distal end of the lower arm 73.

The upper arm 77 is connected to the tip portion of the elbow portion 75 so as to be rotatable about a rotation axis R3Ax4 perpendicular to the rotation axis R3Ax3. The upper arm 77 is driven by the actuator R3Ac4 provided at the joint portion between the upper arm 77 and the elbow portion 75 so as to rotate about the rotation axis R3Ax4 with respect to the tip portion of the elbow portion 75.

The wrist portion 79 is connected to the other side (for example, the left side) of the tip portion of the upper arm 77 so as to be pivotable about a rotation axis R3Ax5 perpendicular to the rotation axis R3Ax4. The wrist portion 79 is driven by the actuator R3Ac5 provided at the joint portion between the wrist portion 79 and the upper arm 77 to rotate about the rotation axis R3Ax5 with respect to the other side of the tip portion of the upper arm 77.

The flange portion 81 is connected to the tip portion of the wrist portion 79 so as to be rotatable about a rotation axis R3Ax6 perpendicular to the rotation axis R3Ax5. The flange portion 81 is driven to rotate about the rotation axis R3Ax6 with respect to the tip portion of the wrist portion 79 by the drive of the actuator R3Ac6 provided at the joint portion between the flange portion 81 and the wrist portion 79.

The hook 35 (an example of a holding portion) is attached to the tip portion of the flange portion 81 via the attachment member 83 to hold the side door 15*b*.

Actuators R3Ac1 to R3Ac6 for driving the respective joint portions include, for example, a servo motor, an encoder, a reduction gear, a brake, and the like. In the above description, the rotation about the rotation axis along the longitudinal direction (or extending direction) of the front-side opening/closing robot 11 is referred to as "rotating", and the rotation about the rotation axis perpendicular to the longitudinal direction (or extending direction) of the front-side opening/closing robot 11 is referred to as "turning".

With the above-described configuration, the front-side opening/closing robot 11 can be installed toward the downstream side (front side) in the conveying direction of the vehicle body 15. As a result, interference with the side door 15*b* can be avoided, and the follow-up distance with respect to the vehicle body 15 (side door 15*b*) can be increased. Therefore, the operating range of the front-side opening/closing robot 11 can be secured, and the moving device becomes unnecessary. Since it is not necessary to install the moving device, which is a heavy object, on the ceiling or wall of the coating booth, reinforcement of the ceiling or wall can be made unnecessary or simple. Further, since the front-side opening/closing robot 11 is disposed above the front-side coating robot 13, it is possible to prevent the operating areas of the respective robots from interfering with each other. Therefore, the open state of the side door 15*b* can be maintained without affecting the coating operation by the front-side coating robot 13.

The configuration of the front-side opening/closing robot 11 described above is an example, and is not limited to the above. For example, the front-side opening/closing robot 11 may include an arm other than the above-described respective arms, or a part of the arm may include a horizontal multi joint structure. Further, a robot other than the six-axis robot may be used.

5. Operating Area of Opening/Closing Robot and Coating Robot

Figure 5:
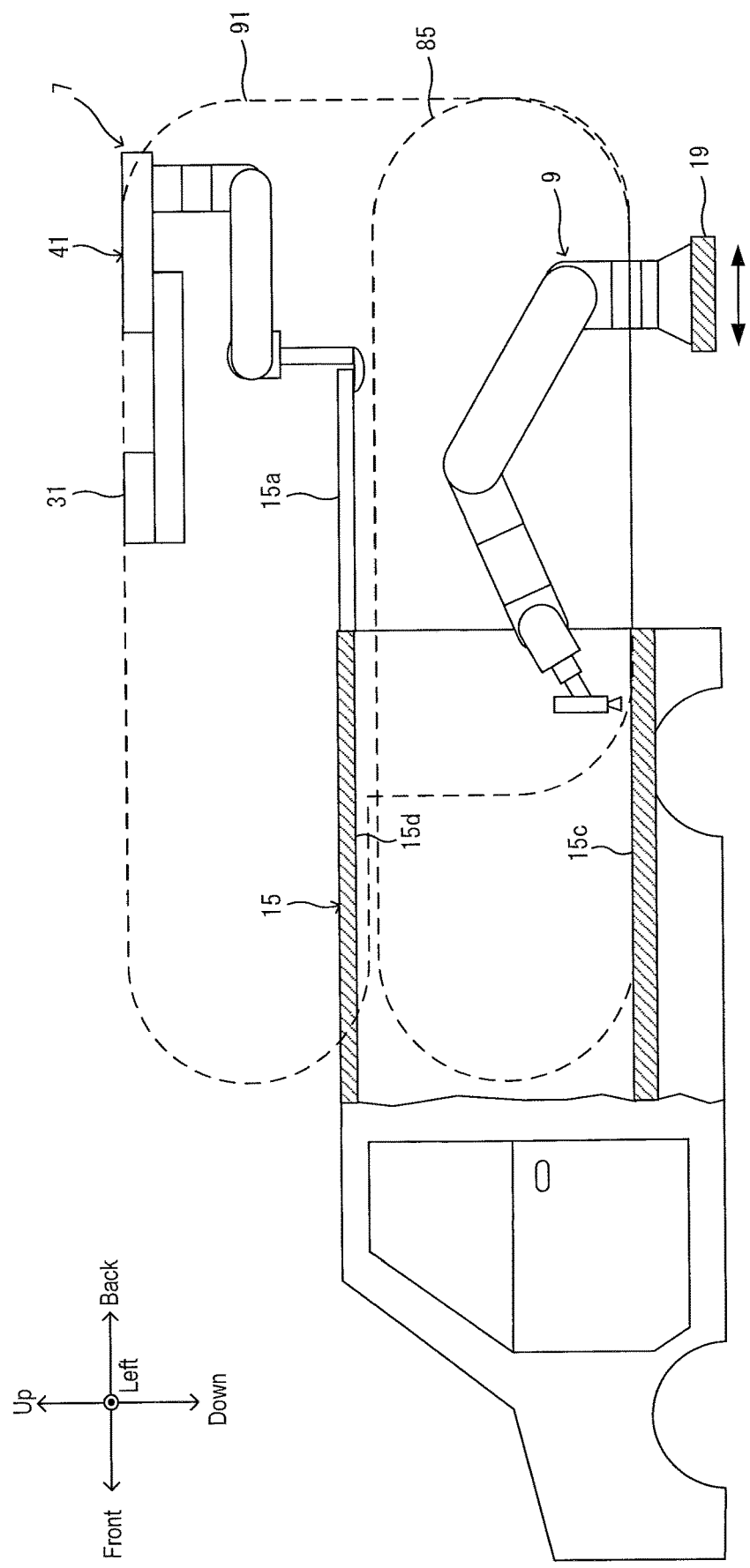
FIG. 5 is a side view showing an example of an operating area of the rear-side opening/closing robot and the rear-side coating robot.
Figure 6:
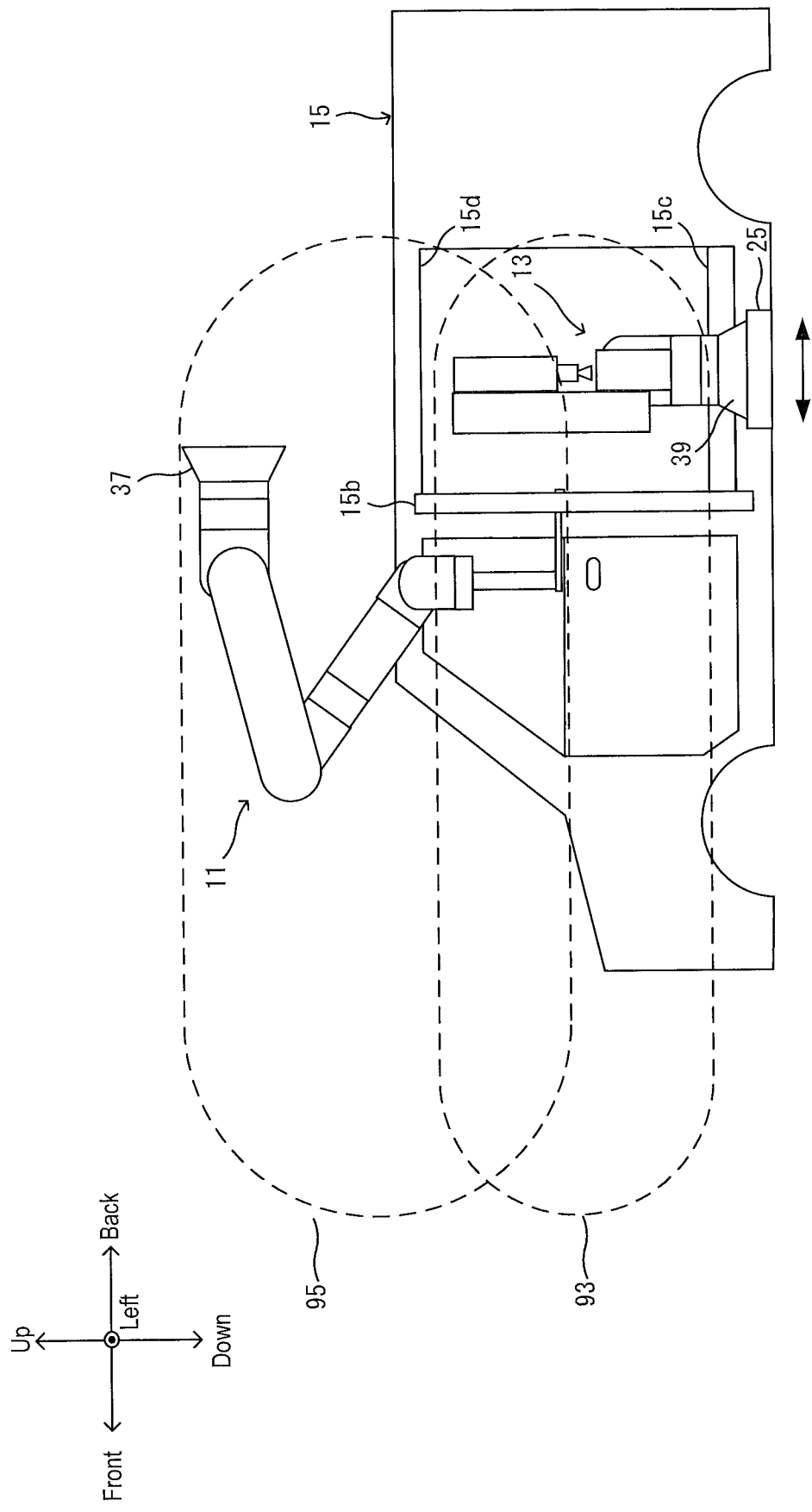
FIG. 6 is a side view showing an example of an operating area of a front-side opening/closing robot and a front-side coating robot.

With reference to FIGS. 5 and 6, an example of an operating area of the rear-side opening/closing robot 7 and the rear-side coating robot 9 and an operating area of the front-side opening/closing robot 11 and the front-side coating robot 13 will be described.

As shown in FIG. 5, the operating area 85, which is the operable range of the rear-side coating robot 9, extends long in the transport direction (front-rear direction) of the vehicle body 15 due to the front-rear movement of the slider 23 of the traveling device 17. The range of the operating area 85 in the vertical direction is, for example, a range from the vicinity of the floor 15*c* to the vicinity of the ceiling 15*d* inside the vehicle body 15. The range of the operating area 85 in the left-right direction is, for example, a range from the vicinity of the left side wall portion 15*e* (see FIG. 7 to be described later) to the vicinity of the right side wall portion 15*f* (see FIG. 7 to be described later) vehicle body 15.

The operating area 91, which is the operable range of the rear-side opening/closing robot 7, extends long in the conveying direction (front-rear direction) of the vehicle body 15 by the operation of the horizontal arm 41. The range of the operating area 91 in the vertical direction is, for example, a range from the vicinity of the base 31 to the vicinity of the lower end of the back door 15*a* of the vehicle body 15 in a closed state. The range of the operating area 91 in the lateral direction is, for example, the range of the width dimension of the back door 15*a* of the vehicle body 15 in the lateral direction.

As described above, the operating area 91 of the rear-side opening/closing robot 7 and the operating area 85 of the rear-side coating robot 9 overlap each other at least partially in the front-rear, left-right directions when viewed from the vertical direction, and at least a part thereof overlap with each other in the up-down direction when viewed from the left-right direction. Therefore, the operation of the rear-side opening/closing robot 7 and the rear-side coating robot 9 is controlled so as not to interfere with each other by the first robot controller 97 and a second robot controller 99 (see FIG. 12) described later.

As shown in FIG. 6, the operating area 93, which is the operable range of the front-side coating robot 13, extends long in the transport direction (front-rear direction) of the vehicle body 15 by the movement of the slider 25 of the traveling device 17 in the front-rear direction. The range of the operating area 93 in the vertical direction is, for example, a range from the vicinity of the floor 15*c* to the vicinity of the ceiling 15*d* inside the vehicle body 15. The range of the operating area 93 in the left-right direction is, for example, a range from the vicinity of the base 39 to the vicinity of the right-side wall portion 15*f* inside the vehicle body 15.

The operating area 95, which is the range in which the front-side opening/closing robot 11 can operate, is set forward and extends long in the transport direction (front-rear direction) of the vehicle body 15. The range of the operating area 95 in the vertical direction is, for example, a range from the vicinity of the base 37 to the vicinity of an intermediate portion in the vertical direction (a portion where the hook 35 is hooked) of the side door 15*b* of the vehicle body 15. The range of the operating area 95 in the left-right direction is, for example, the range of the width dimension in the left-right direction of the side door 15*b* opened substantially parallel to the left-right direction.

As described above, at least a part of the operating area 95 of the front-side opening/closing robot 11 and the operating area 93 of the front-side coating robot 13 overlap with each other in the front rear and left-right directions when viewed from the vertical direction, and at least a part thereof overlap with each other in the up-down direction when viewed from the left-right direction. Therefore, the operation of the front-side opening/closing robot 11 and the front-side coating robot 13 is controlled so as not to interfere with each other by a third robot controller 101 and a fourth robot controller 103 (see FIG. 12).

6. Configuration of Turning Arm 19 and Installation Height of Rear-Side Coating Robot Referring to FIG. 7, an example of the configuration of the turning arm 19 and the installation height of the rear-side coating robot 9 will be described.

Figure 7:
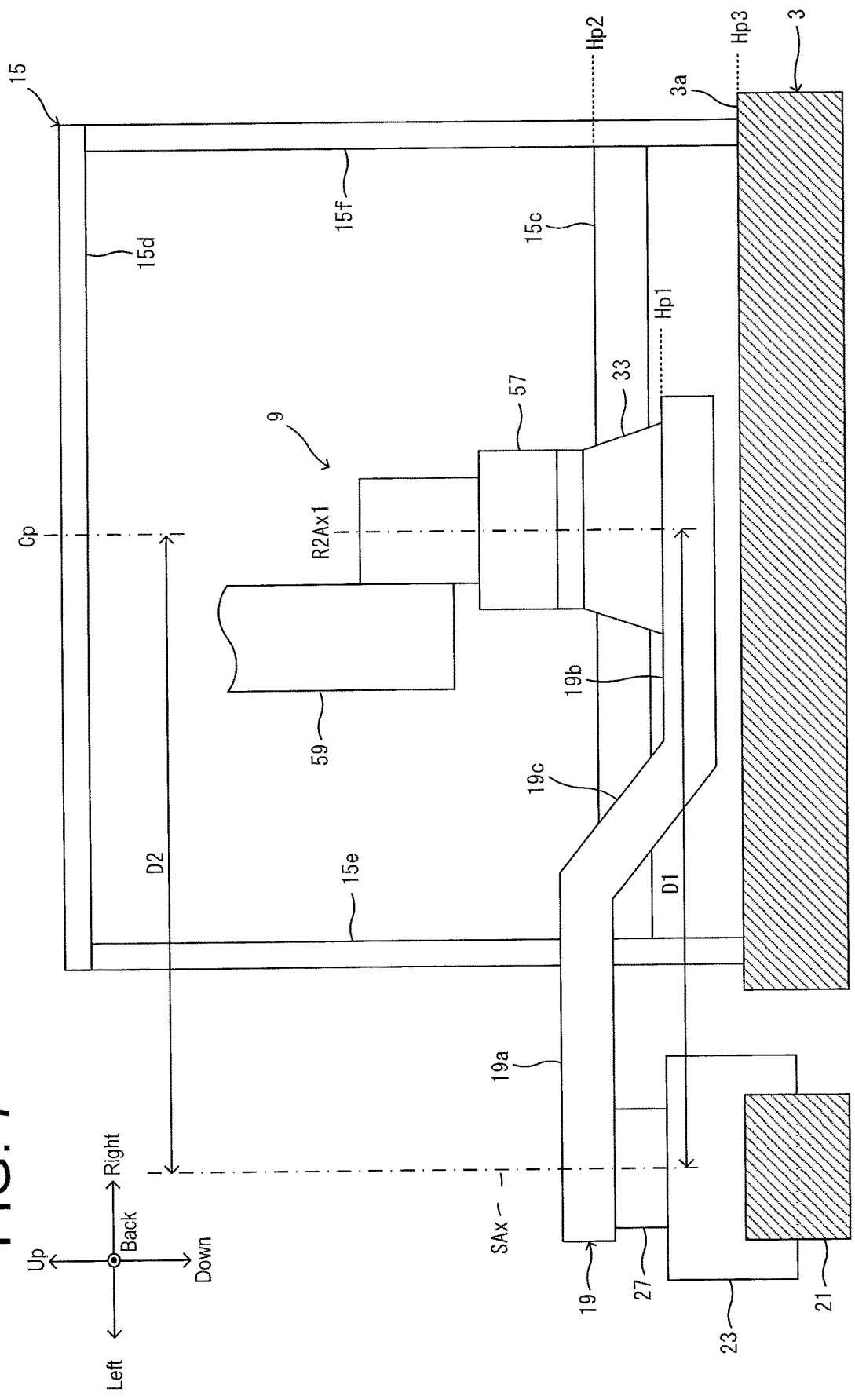
FIG. 7 is a rear view showing an example of the configuration of the turning arm and the installation height of the rear-side coating robot.

As shown in FIG. 7, the turning arm 19 has a base 19a, a mounting portion 19b, and a connecting portion 19c. The base 19a is connected to the slider 23 and extends in the horizontal direction. The mounting portion 19b is connected to the base 19a via a connecting portion 19e, and extends in the horizontal direction below the upper surface of the base 19a in the vertical direction. The connecting portion 19c extends at a predetermined angle with respect to the horizontal direction and connects the base 19a and the mounting portion 19b having different height positions. The rear-side coating robot 9 is mounted on a mounting portion 19b of the turning arm 19. The base 33 of the rear-side coating robot 9 is installed on the mounting portion 19b at a height position Hp1 between a placing surface 3a of the conveyor 3 on which the vehicle body 15 is placed and a coating target (for example, a floor 15c or the like) located at the lowest position inside the vehicle body 15. That is, the height position Hp1, which is the installation height of the rear-side coating robot 9, is located in the vertical direction between the height position Hp2 of the coating target (for example, floor 15c or the like) located at the lowest position inside the vehicle body 15 and the height position Hp3 of the placing surface 3a of the conveyor 3.

With the above-described configuration, the following effects can be obtained. For example, when coating a lower portion to be painted inside the vehicle body 15 (for example, the floor 15c), if the installation position of the rear-side coating robot 9 is high, any arm element (for example, the lower arm 59 or the elbow portion 61) of the rear-side coating robot 9 is likely to interfere with the upper portion of the vehicle body 15 (for example, the ceiling 15d). In this embodiment, since the installation position of the rear-side coating robot 9 can be lowered by the above-described configuration, it is possible to paint the lower part of the interior of the vehicle body 15 to be painted while avoiding interference between the rear-side coating robot 9 and the upper part of the vehicle body 15.

As shown in FIG. 6, the base 39 of the front-side coating robot 13 is mounted on the slider 25 at a height position between the placing surface 3a of the conveyor 3 and the coating target (for example, the floor 15c) located at the lowest position in the vehicle body 15. As a result, the same effect as described above can be obtained.

The turning arm 19 is configured such that, in a state parallel to the left-right direction (a state in which the turning arm 19 is rotated by approximately 90 degrees from an angle parallel to the transfer direction of the vehicle body 15), the distance D1 between the turning axis SAx and, for example, the rotation axis R2Ax1 of the mounted rear-side coating robot 9 and the distance D2 between the turning axis SAx and the center position Cp of the vehicle body 15 in the left-right direction are approximately equal. Thus, by turning the turning arm 19, the rear-side coating robot 9 can be positioned at a substantially central position in the width direction of the vehicle body 15. When the rear-side coating robot 9 accesses the interior of the vehicle body 15 through the rear back door 15a, coating can be performed while avoiding interference with the left and right wall sections 15e, 15f of the vehicle body 15.

7. Joint Driving Angle of Rear-Side Coating Robot

Figure 8:
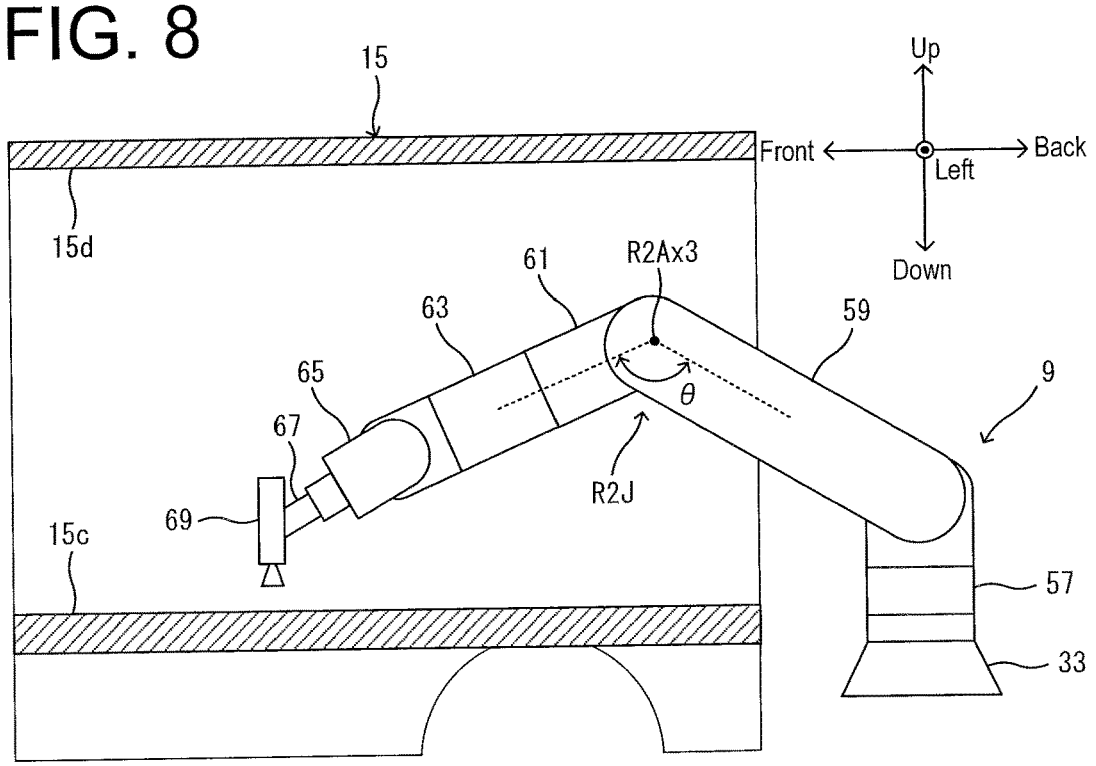
FIG. 8 is a side view showing an example of a joint driving angle of the rear-side coating robot.
Figure 9:
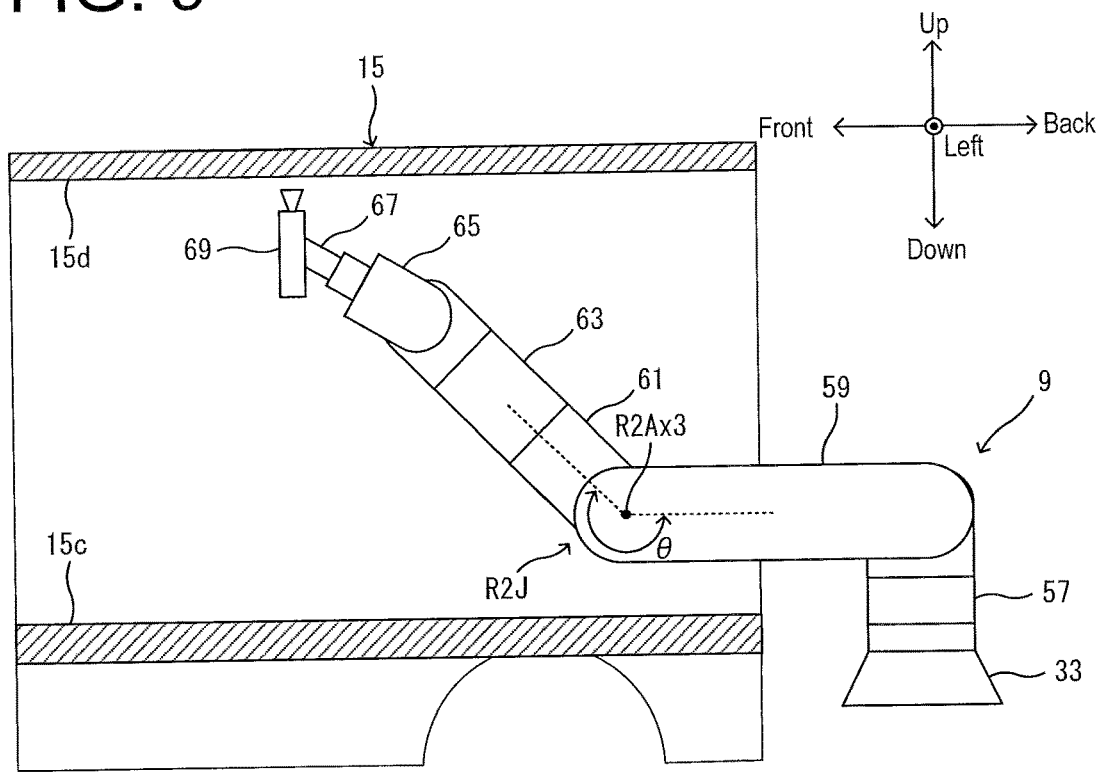
FIG. 9 is a side view showing an example of a joint driving angle of the rear side coating robot.

With reference to FIGS. 8 and 9, an example of the joint driving angle of the rear-side coating robot 9 will be described.

The rear-side coating robot 9 has a lower arm 59 and an elbow portion 61 which are two adjacent arm elements, and a joint portion R2J which connects the lower arm 59 and the elbow portion 61 so as to be rotatable about a rotation axis R2Ax3 extending in a direction perpendicular to the extending direction of each arm element. The joint portion R2J is connected so that one of the lower arm 59 and the elbow portion 61 can rotate in both directions (for example, clockwise direction) and the other side (for example, counterclockwise direction) in the circumferential direction around the rotation axis R2Ax3 with respect to the other from an angle (θ is approximately 180 degrees) at which the extending directions of the lower arm 59 and the elbow portion 61 are parallel to each other.

As shown in FIG. 8, for example, when the rear-side coating robot 9 paints the floor 15c inside the vehicle body 15, the joint portion R2J turns the elbow portion 61 in the downward direction (in the counterclockwise direction when viewed from the left side, clockwise direction when viewed from the right) from the angle at which the extending directions of the lower arm 59 and the elbow portion 61 are parallel to each other. In other words, the lower relative angle θ between the lower arm 59 and the elbow portion 61 is smaller than 180 degrees. On the other hand, as shown in FIG. 9, for example, when the rear-side coating robot 9 paints the ceiling 15d inside the vehicle body 15, the joint portion R2J turns the elbow portion 61 in the upward direction (in the clockwise direction when viewed from the left side, in the counterclockwise direction when viewed from the right side) from the angle at which the extending directions of the lower arm 59 and the elbow portion 61 are parallel to each other. In other words, the lower relative angle θ between the lower arm 59 and the elbow portion 61 is greater than 180 degrees.

With the above-described configuration, the following effects can be obtained. If the lower arm 59 and the elbow portion 61 have a structure in which they are bent only to one side at the joint portion R2J, for example, when coating an upper portion to be painted (for example, the ceiling 15d) inside the vehicle body 15, any of the arm elements (for example, the lower arm 59 and the elbow portion 61) of the rear-side coating robot 9 is likely to interfere with the upper portion of the vehicle body 15 (for example, the ceiling 15d). In this embodiment, since the lower arm 59 and the elbow portion 61 are bent to both sides at the joint portion R2J, it is possible to paint the upper portion of the vehicle body 15 while avoiding interference between the rear-side coating robot 9 and the upper portion of the vehicle body 15.

The joint structure similar to that described above may be applied to joints other than the joint portion R2J of the rear-side coating robot 9. The joint structure similar to that described above may be applied to any of the joints of the rear-side opening/closing robot 7, the front-side opening/closing robot 11, and the front-side coating robot 13.

8. Turning Angle of Turning Arm

An example of a turning angle of the turning arm 19 will be described with reference to FIGS. 10 and 11.

Figure 10:
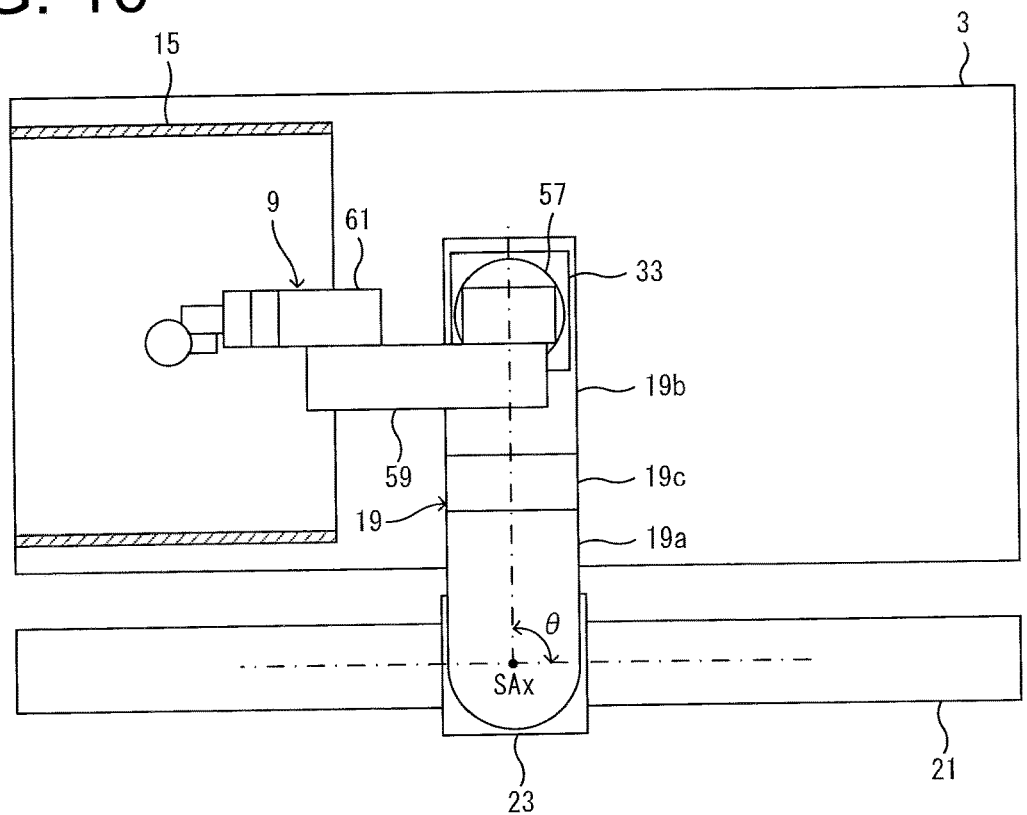
FIG. 10 is a top view showing an example of a turning angle of the turning arm.

As shown in FIG. 10, the turning arm 19 is disposed on the slider 23 so as to be rotatable in a predetermined angular range including an angle parallel to the conveying direction (front-rear direction) of the vehicle body 15 in the circumferential direction about the turning axis SAx parallel to the vertical direction. The "angle parallel to the conveying direction" means an angle θ between the turning arm 19 and a portion of the rail 21 on the upstream side in the conveying direction is 0° or 180°. FIG. 10 shows a state where θ is approximately 90 degrees. The "predetermined angular range" is an angular range in which the turning arm 19 can rotate mechanically, and may be, for example, approximately 180 degrees or an angular range larger than 180 degrees. In this embodiment, the turning arm 19 can be rotated in an angular range larger than 180 degrees.

Figure 11:
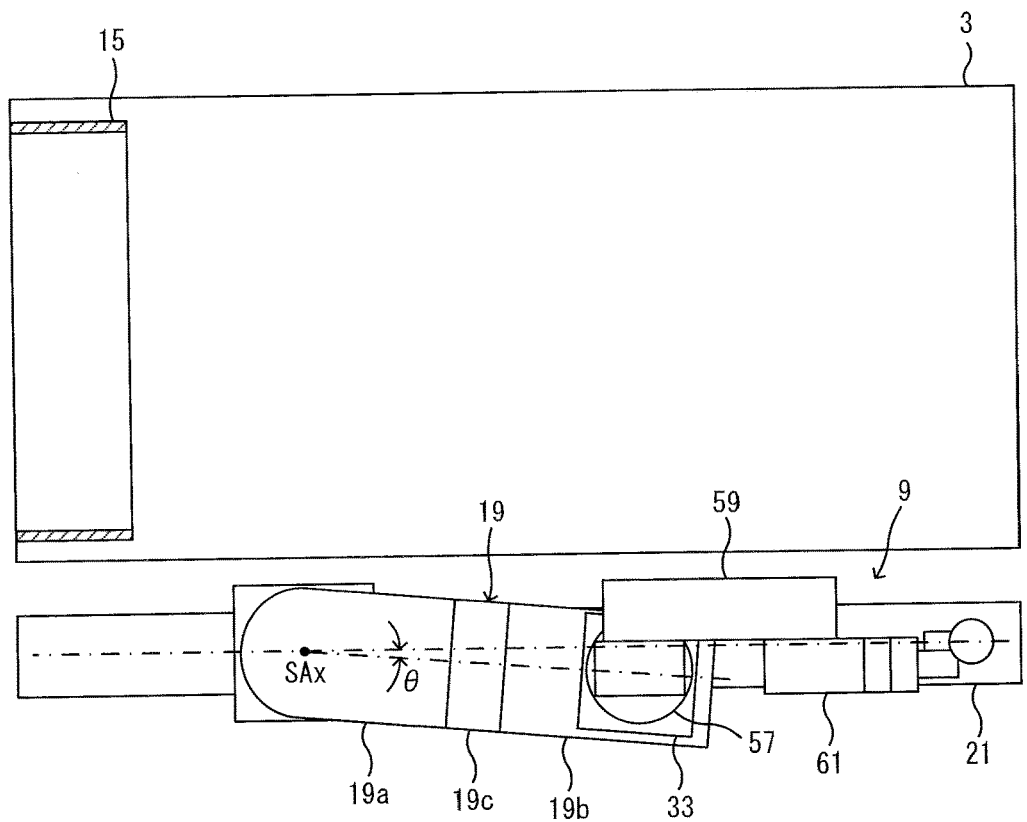
FIG. 11 is a top view showing an example of a turning angle of the turning arm.

As shown in FIG. 11, the turning arm 19 is installed on the slider 23 so that the mounting portion 19b on which the rear-side coating robot 9 is mounted can turn in the direction away from the transfer path (conveyor 3) of the vehicle body 15 from an angle (angle θ is approximately 0 degrees) parallel to the transfer direction (front-rear direction) of the vehicle body 15 in the circumferential direction around the turning axis SAx. In the example shown in FIG. 11, the mounting portion 19b of the turning arm 19 is rotated by a predetermined angle θ (in a range from 0 degrees to minus 90 degrees) in the direction away from the conveyor 3 so that the lower arm 59 of the rear side coating robot 9 does not interfere with the conveying path of the vehicle body 15.

With this configuration, when the rear-side coating robot 9 performs coating work on the vehicle body 15, the rear-side coating robot 9 can be moved to an optimum coating position by turning the turning arm 19 at a predetermined angle θ from an angle parallel to the longitudinal direction toward the vehicle body 15. When the vehicle body 15 passes, the turning arm 19 is turned and retracted at an angle parallel to the front-rear direction (angle θ is approximately 0 degrees), thereby avoiding interference with the vehicle body 15. Further, by turning the turning arm 19 in the direction in which the angle θ becomes negative (the direction in which the mounting portion 19b separates from the conveyor 3), it is possible to avoid interference between the rear-side coating robot 9 and the vehicle body 15 while bringing the turning axis SAx of the turning arm 19 closer to the transport path (conveyor 3) of the vehicle body 15. As a result, the width dimension of the coating booth can be reduced.

9. Functional Configuration of Host Controller and Control Configuration of Coating System 1

Next, an example of the functional configuration of the host controller and the control configuration of the coating system 1 will be described with reference to FIG. 12.

Figure 12:
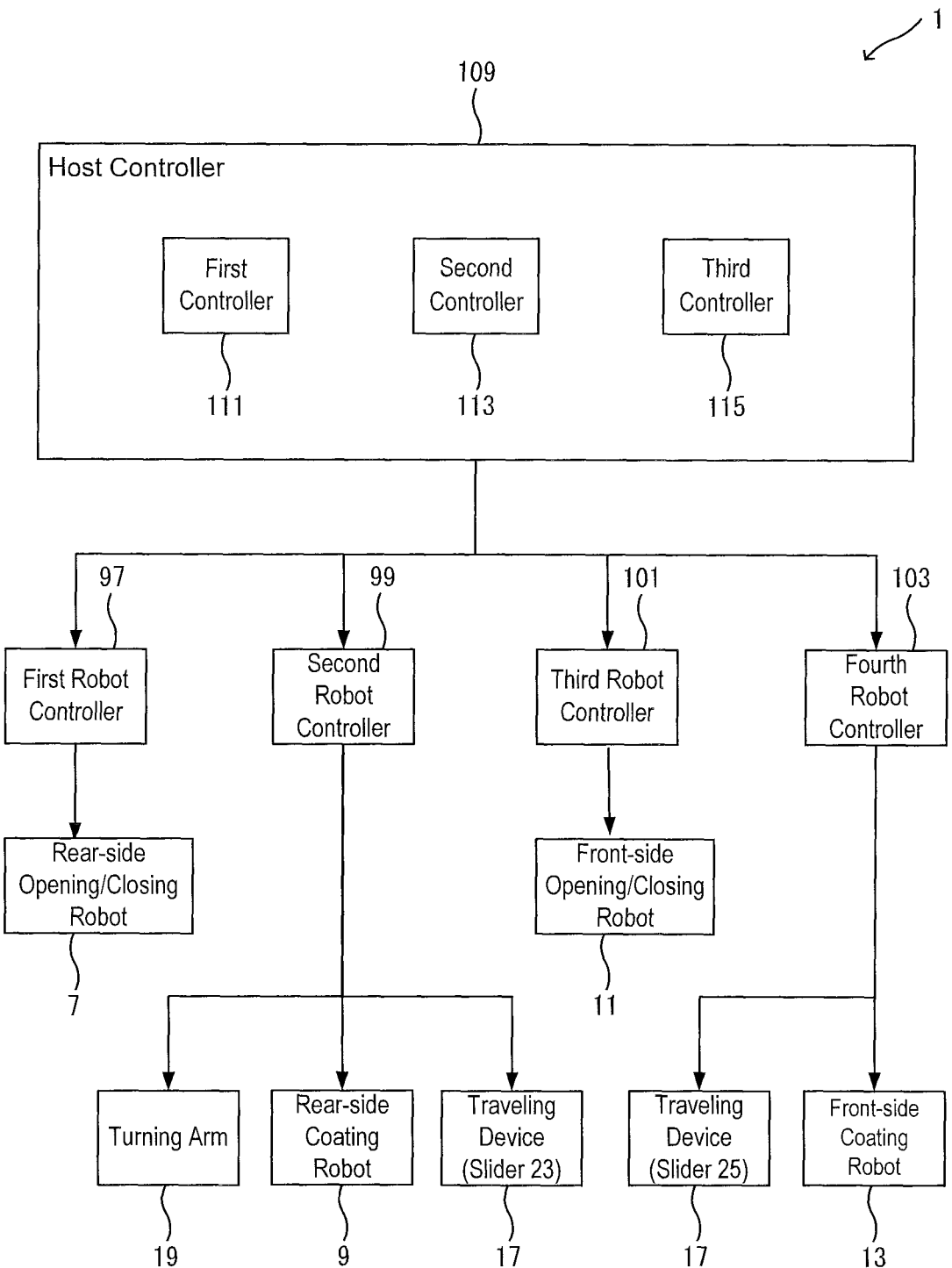
FIG. 12 is a block diagram showing an example of a functional configuration of a host controller and a control configuration of a coating system.

As shown in FIG. 12, the coating system 1 includes a first robot controller 97, a second robot controller 99, a third robot controller 101, a fourth robot controller 103, and a host controller 109.

The first robot controller 97 calculates a target rotation angle or the like of each servo motor of each actuator R1Ac1 to R1Ac6 necessary for moving the front end position (for example, the position of the hook 29) of the rear-side opening/closing robot 7 to a desired position, based on a command (for example, a position command or the like) input from the host controller 109. The first robot controller 97 controls the driving power to be supplied to each servo motor of each of the actuators R1Ac1 to R1Ac6 based on the motor position command corresponding to the calculation result and the detection value of each encoder of each servo motor, thereby controlling the operation of the rear-side opening/closing robot 7.

The second robot controller 99 calculates a target rotation angle or the like of each servo motor of each of the actuators R2Ac1 to R2Ac6 necessary for moving the front end position of the rear-side coating robot 9 (for example, the position of the coating gun 69) to a desired position based on a command (for example, a position command or the like) input from the host controller 109. The second robot controller 99 controls the drive power to be supplied to each servo motor of each of the actuators R2Ac1 to R2Ac6 based on the motor position command corresponding to the calculation result and the detection value of each encoder of each servo motor, thereby controlling the operation of the rear-side coating robot 9.

Further, the second robot controller 99 calculates a target rotation angle of the servo motor of the actuator 27 necessary for turning the rotation angle of the turning arm 19 to a desired angle based on a command (for example, a position command) input from the host controller 109. The second robot controller 99 controls the driving power to be supplied to the servo motor of the actuator 27 based on the motor position command corresponding to the calculation result and the detection value of the encoder of the servo motor, thereby controlling the turning operation of the turning arm 19.

Further, the second robot controller 99 calculates a target rotation angle of a servo motor of an actuator necessary for moving the position of the slider 23 on which the rear-side coating robot 9 is mounted to a desired position based on a command (for example, a position command) input from the host controller 109. The second robot controller 99 controls the position of the slider 23 by controlling the drive power to be supplied to the servo motor of the actuator based on the motor position command corresponding to the calculation result and the detection value of the encoder of the servo motor.

The third robot controller 101 calculates a target rotation angle or the like of each servo motor of each actuator R3Ac1 to R3Ac6 necessary for moving the front end position (for example, the position of the hook 35) of the front-side opening/closing robot 11 to a desired position based on a command (for example, a position command or the like) input from the host controller 109. The third robot controller 101 controls the driving power to be supplied to each servo motor of each of the actuators R3Ac1 to R3Ac6 based on the motor position command corresponding to the calculation result and the detection value of each encoder of each servo motor, thereby controlling the operation of the front-side opening/closing robot 11.

The fourth robot controller 103 calculates a target rotation angle or the like of each servo motor of each of the actuators R2Ac1 to R2Ac6 necessary for moving the front end position of the front-side coating robot 13 (for example, the position of the coating gun 69) to a desired position based on a command (for example, a position command or the like) input from the host controller 109. The fourth robot controller 103 controls the drive power to be supplied to each servo motor of each of the actuators R2Ac1 to R2Ac6 based on the motor position command corresponding to the calculation result and the detection value of each encoder of each servo motor, thereby controlling the operation of the front-side coating robot 13.

Further, the fourth robot controller 103 calculates a target rotation angle of a servo motor of an actuator necessary for moving the position of the slider 25 on which the front-side coating robot 13 is mounted to a desired position based on a command (for example, a position command) input from the host controller 109. The fourth robot controller 103 controls the position of the slider 25 by controlling the drive power to be supplied to the servo motor of the actuator based on the motor position command corresponding to the calculation result and the detection value of the encoder of the servo motor.

The host controller 109 outputs a command to each of the controllers described above, and controls the coating system 1 in an integrated manner. The host controller 109 includes a first control unit (an example of "first control circuitry") 111, a second control unit (an example of "second control circuitry") 113, and a third control unit (an example of "third control circuitry") 115.

The first control unit 111 controls at least one of the slider 23 and the turning arm 19 of the traveling device 17 via the second robot controller 99 so that the rear-side coating robot 9 follows the vehicle body 15 continuously conveyed by the conveyor 3. Further, the first control unit 111 controls the slider 25 of the traveling device 17 via the fourth robot controller 103 so that the front coating robot 13 follows the vehicle body 15 continuously conveyed by the conveyor 3. As a result, the teaching data obtained while the vehicle body 15 is stopped can be used for the rear-side coating robot 9 and the front-side coating robot 13, thereby facilitating the teaching operation for the rear-side coating robot 9 and the front-side coating robot 13.

The second control unit 113 controls the horizontal arm 41 of the rear-side opening/closing robot 7 through the first robot controller 97 so that the vertical arm 43 (hook 29) of the rear-side opening/closing robot 7 follows the vehicle body 15 continuously conveyed by the conveyor 3. Thus, the back door 15a can be kept open with respect to the continuously conveyed vehicle body 15 without providing a moving device for moving the rear-side opening/closing robot 7.

When the rear-side coating robot 9 is retracted from the transfer path of the vehicle body 15, the third control unit 115 turns the turning arm 19 so that the mounting portion 19b of the turning arm 19 on which the rear-side coating robot 9 is mounted moves to the upstream side in the transfer direction of the vehicle body 15. As a result, when a coating operation is performed on the vehicle body 15, the turning of the turning arm 19 can be started after the rear end of the vehicle body 15 has passed through the front end of the turning arm 19 facing the upstream side, and a follow-up distance can be secured.

The processes performed by the first control unit 111, the second control unit 113, the third control unit 115, and the like are not limited to the examples of sharing of these processes, and may be performed by, for example, a smaller number of processing units (for example, one processing unit), or may be performed by further subdivided processing units. Further, the functions of each control unit of the host controller 109 may be implemented by a program executed by the CPU 901 (see FIG. 19) described below, or a part or all of the functions may be implemented by an actual device such as an ASIC, an FPGA, or other electric circuit.

10. Processing Procedure by Host Controller, Etc.

Figure 13:
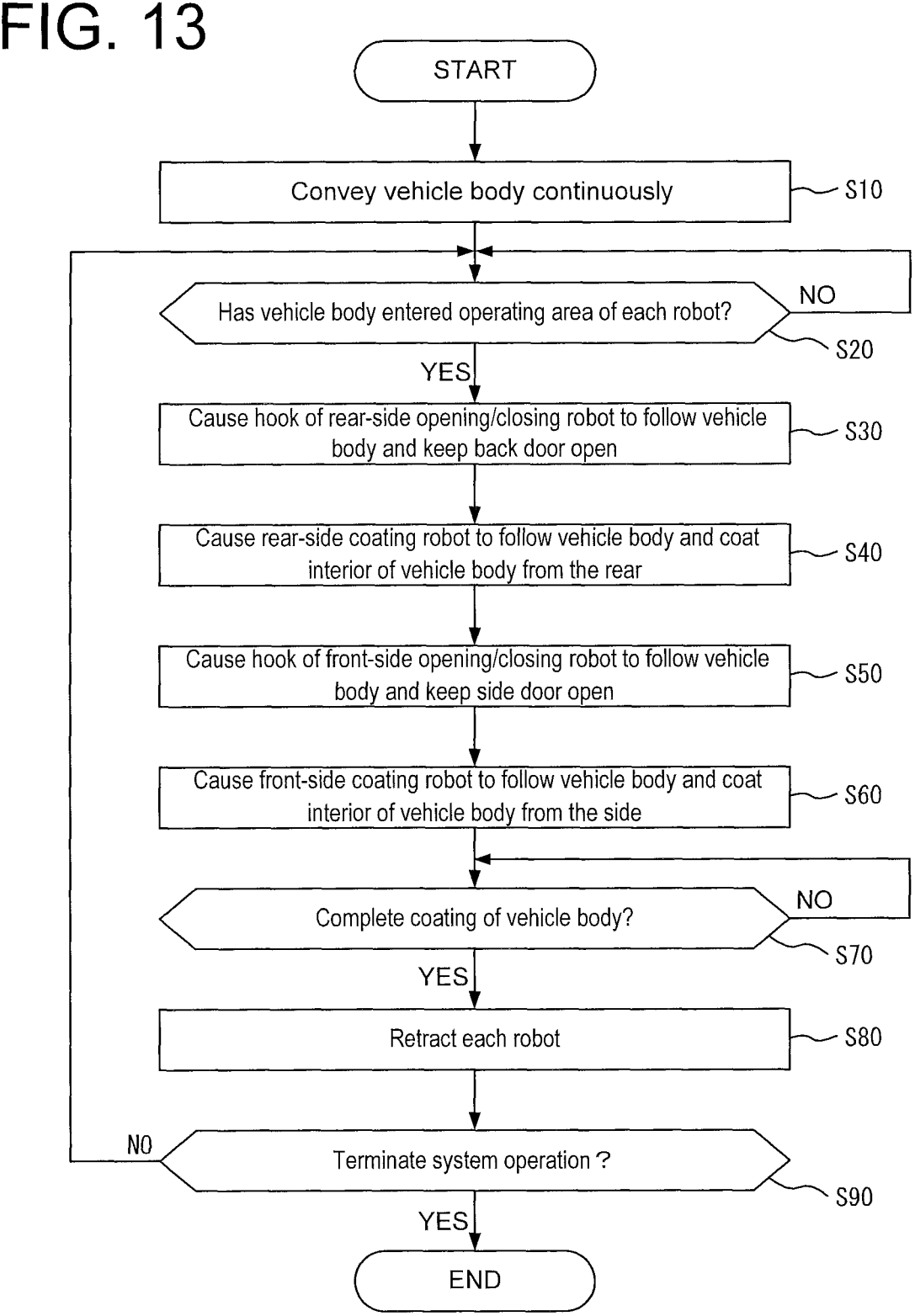

Referring to FIG. 13, an example of a processing procedure executed by the host controller 109 or the like (including each of the controllers described above) will be described.

In step S10, the host controller 109 or the like drives the conveyor 3 to continuously convey the vehicle body 15. The conveyor 3 may be driven by an operator's operation.

In step S20, the host controller 109 or the like determines whether or not the vehicle body 15 has entered the operating area of the rear-side opening/closing robot 7 and the rear-side coating robot 9, or the operating area of the front-side opening/closing robot 11 and the front-side coating robot 13. This step S20 is repeated until the vehicle body 15 enters the operating area (step S20: NO), and if the vehicle body 15 enters the operating area (step S20: YES), the process proceeds to the next step S30.

In step S30, the host controller 109 or the like controls the posture of the horizontal arm 41 of the rear-side opening/closing robot 7 by the second control unit 113 so that the hook 29 follows the vehicle body 15, and opens the back door 15a to maintain the open state.

In step S40, the host controller 109 or the like uses the first control unit 111 to control at least one of the traveling device 17 and the turning arm 19 to cause the rear-side coating robot 9 to follow the vehicle body 15, and while controlling the turning arm 19 to move the rear-side coating robot 9 to the optimum coating position, the interior of the vehicle body 15 is painted by the rear-side coating robot 9 from the rear through the opened back door 15a.

In step S50, the host controller 109 or the like controls the posture of the front-side opening/closing robot 11 so that the hook 35 follows the vehicle body 15, and opens the side door 15b to maintain the open state.

In step S60, the host controller 109 or the like controls the traveling device 17 by the first control unit 111 so that the front-side coating robot 13 follows the vehicle body 15, and paints the inside of the vehicle body 15 from the side by the front-side coating robot 13 through the opened side door 15b.

In step S70, the host controller 109 or the like determines whether coating of the vehicle body 15 has been completed. This step S70 is repeated until coating of the vehicle body 15 is completed (step S70: NO), and when coating of the vehicle body 15 is completed (step S70: YES), the process proceeds to the next step S80.

In step S80, the host controller 109 or the like causes the third control unit 115 to evacuate each robot from the transport path of the vehicle body 15. For example, the host controller 109 or the like sets the rear-side opening/closing robot 7 to a predetermined retreat posture. Further, for example, the host controller 109 or the like causes the turning arm 19 to turn so that the mounting portion 19b moves to the upstream side in the transfer direction of the vehicle body 15, thereby moving the rear side coating robot 9 away from the transfer path of the vehicle body 15, and causes the slider 23 to travel so that the rear side coating robot 9 is moved to a predetermined retreat position, thereby bringing the rear-side coating robot 9 into a predetermined retreat attitude. Further, for example, the host controller 109 or the like sets the front-side opening/closing robot 11 to a predetermined retreat posture. Further, for example, the host controller 109 or the like causes the slider 25 to travel to move the front-side coating robot 13 to a predetermined retreat position and to bring it into a predetermined retreat attitude. As a result, the next vehicle body 15 can pass until it enters the operating area of each robot.

In step S90, the host controller 109 or the like determines whether or not to terminate the operation of the coating system 1. If the operation is not to be terminated (step S90: NO), the process returns to step S20 and the same procedure is repeated. On the other hand, when the operation is to be terminated (step S90: YES), the present flowchart is terminated.

The processing procedure described above is an example, and at least a part of the above procedure may be deleted or changed, or other procedures may be added. The order of at least some of the above steps may be changed, or a plurality of steps may be combined into a single step.

11. Effects of Embodiment

As described above, the coating system 1 according to the embodiment includes the rear-side opening/closing robot 7 having the base 31 fixed to the structure constituting the coating booth and opening the back door 15a of the vehicle body 15, and the rear-side coating robot 9 having the base 33 disposed below the base 31 in the vertical direction and coating the inside of the vehicle body 15 via the back door 15a opened by the rear-side opening/closing robot 7.

In the coating system 1 of the present embodiment, the rear-side opening/closing robot 7 for opening the back door 15a of the vehicle body 15 is installed at a relatively higher position than the rear-side coating robot 9 for coating the interior of the vehicle body 15. As a result, even when the vehicle body 15 is provided with a back door 15a that opens and closes in the vertical direction, for example, the back door 15a can be pulled upward to open largely, and the back door 15a can be opened favorably. As a result, it is possible to secure an operating area for the rear-side coating robot 9 to paint the interior of the vehicle body 15, so that high-quality coating can be performed. Further, by making the height positions of the rear-side opening/closing robot 7 and the rear-side coating robot 9 different from each other, it is possible to prevent the operating area 91 of the rear-side opening/closing robot 7 from interfering with the operating area 85 of the rear-side coating robot 9, and it is possible to secure the operating areas of the respective robots. Further, since the rear-side opening/closing robot 7 disposed above is fixed to the structure, it is not necessary to install the moving device for the rear-side opening/closing robot 7, which is a heavy object, on the ceiling or wall of the coating booth, and it is not necessary or simple to reinforce the ceiling or wall.

The coating system 1 also includes a front-side opening/closing robot 11 which is equipped with a base 37 fixed to a structure constituting a coating booth and opens a side door 15b of a vehicle body 15, and a front-side coating robot 13 which is equipped with a base 39 disposed below the base 37 in the vertical direction and paints the interior of the vehicle body 15 through the side door 15b opened by the front-side opening/closing robot 11.

In the coating system 1 of the present embodiment, the front-side opening/closing robot 11 for opening the side door 15b of the vehicle body 15 is installed at a relatively higher position than the front-side coating robot 13 for coating the inside of the vehicle body 15. As a result, even when the vehicle body 15 is provided with the side door 15b which opens and closes in the horizontal direction, for example, by holding the side door 15b from above, the side door 15b can be opened without interfering with the side door 15b, and the side door 15b can be opened favorably. As a result, it is possible to secure an operating area for the front-side coating robot 13 to paint the inside of the vehicle body 15, so that high-quality coating can be performed. Further, by making the height positions of the front-side opening/closing robot 11 and the front-side coating robot 13 different from each other, it is possible to prevent the operating area 95 of the front-side opening/closing robot 11 and the operating area 93 of the front-side coating robot 13 from interfering with each other, and it is possible to secure the operating areas of the respective robots. Further, since the front-side opening/closing robot 11 disposed above is fixed to the structure, it is not necessary to install the moving device for the front-side opening/closing robot 11, which is a heavy object, on the ceiling or wall of the coating booth, and it is not necessary or simple to reinforce the ceiling or wall.

In the embodiment, the coating system 1 may have a conveyor 3 for conveying the vehicle body 15 in the front-rear direction, and a moving device 5 for moving the rear-side coating robot 9 in the front-rear direction and the rear-side coating robot 9 in the left-right direction intersecting the front-rear direction.

In this case, by moving the rear-side coating robot 9 in the front-rear direction and the left-right direction, the operating range of the rear-side coating robot 9 can be expanded. Further, by moving the rear-side coating robot 9 in the front-rear direction, the rear-side coating robot 9 can follow the conveyed vehicle body 15, so that it is possible to instruct the rear-side coating robot 9 while the vehicle body 15 is stopped, thereby facilitating the teaching operation. Further, by moving the rear-side coating robot 9 in the lateral direction, it is possible to move the rear-side coating robot 9 to an optimum coating position, so that the quality of coating can be improved. For example, the rear-side coating robot 9 can be made to go around the front surface side or the rear surface side of the vehicle body 15, and a part of the rear-side coating robot 9 (for example, the tip portion having the coating gun 69 mounted thereon) can be made to easily enter from the front surface side or the rear surface side of the vehicle body 15, so that the interior of the vehicle body 15 can be painted more efficiently.

In the embodiment, the moving device 5 may have a traveling device 17 for moving the slider 23 in the front-rear direction, and a turning arm 19 installed on the slider 23 and turning around a turning axis SAx along the vertical direction, and in this case, the rear-side coating robot 9 may be mounted on the turning arm 19.

In this case, the rear-side coating robot 9 can be moved in the front-rear direction by moving the slider 23 by the traveling device 17, and can be moved in the front-rear direction and the left-right direction by turning the turning arm 19. By using the turning arm 19, when a coating operation is performed on the vehicle body 15, the turning arm 19 is projected toward the vehicle body 15 so that the rear-side coating robot 9 can be moved to an optimum coating position. When passing the vehicle body 15, the turning arm 19 is retracted to avoid interference with the vehicle body 15.

In the embodiment, the rear-side opening/closing robot 7 may have a horizontal arm 41 of a horizontal multi joint type connected to the base 31 and a vertical arm 43 of a vertical multi joint type connected to the tip portion of the horizontal arm 41 and holding the back door 15a.

If the moving device is installed in order to expand the operating range of the rear-side opening/closing robot 7 disposed above, it is desirable to reinforce the ceiling and walls of the coating booth on a large scale, because the moving device is heavy and generates vibration. In the present embodiment, the rear-side opening/closing robot 7 has a horizontal arm 41 of a horizontal multi joint type on the base side and a vertical arm 43 of a vertical multi joint type on the tip side. By forming the horizontal arm 41 on the base 31 side into a horizontal multi joint structure, an operating range can be secured while avoiding interference with an upper structure (ceiling, etc.). Further, by forming the vertical arm 43 at the tip end side into a vertical multi joint structure, it becomes possible to operate in multiple directions including the vertical direction, and the degree of freedom of the tip portion can be improved. Therefore, the operating range of the rear-side opening/closing robot 7 can be secured without providing the moving device, and the door can be opened favorably regardless of the opening/closing direction of the door.

In the embodiment, the horizontal arm 41 may have a plurality of arms including a first arm 45 that is connected to the base 31 so as to be rotatable about a rotation axis R1Ax1 along the vertical direction, and in this case, the plurality of arms may be connected to each other so as to be rotatable about a rotation axis along the vertical direction.

In this embodiment, each arm constituting the horizontal arm 41 rotates in the horizontal direction with respect to the base 31 or the arm on the base side. As a result, the operating range of the rear-side opening/closing robot 7 can be secured while preventing interference with the upper structure (ceiling, etc.). Further, the operating range of the rear-side opening/closing robot 7 can be expanded in accordance with the length and number of the respective arms constituting the horizontal arm 41.

In an embodiment, the vertical arm 43 may have at least one arm including a fourth arm 51 which is connected to the tip portion of the horizontal arm 41 so as to be rotatable about a rotation axis R1Ax4 extending in the horizontal direction perpendicular to the vertical direction, and a hook 29 which is connected to the tip portion and holds the back door 15*a*.

In this embodiment, the a in constituting the vertical arm 43 rotates in the vertical direction with respect to the tip portion of the horizontal arm 41. As a result, the hook 29 can be moved in the vertical direction, so that even in the case of the back door 15*a* which opens and closes in the vertical direction, the opening can be performed satisfactorily.

In an embodiment, the rear-side coating robot 9 may have a lower arm 59 and an elbow portion 61 which are two adjacent arm elements, and a joint portion R2J which connects the lower arm 59 and the elbow portion 61 so as to be able to rotate about a rotation axis R2Ax3 along a direction perpendicular to the extension direction of each arm element, and in this case, the joint portion R2J may connect one of the lower arm 59 and the elbow portion 61 so as to be able to rotate in both directions of one side and the other side in the circumferential direction about the rotation axis R2Ax3 with respect to the other from an angle at which the extension directions of the lower arm 59 and the elbow portion 61 are parallel to each other.

If the lower arm 59 and the elbow portion 61 adjacent to each other are bent only to one side at the joint portion R2J, for example, when coating an upper portion to be coated inside the vehicle body 15, some of the arm elements of the rear-side coating robot 9 are likely to interfere with the upper portion of the vehicle body 15. In this embodiment, since the adjacent lower arm 59 and the adjacent elbow portion 61 are bent to both sides at the joint portion R2J, it is possible to paint the upper portion of the vehicle body 15 (for example, the ceiling 15*d*) inside the vehicle body 15 while avoiding interference between the rear-side coating robot 9 and the upper portion of the vehicle body 15.

In an embodiment, the turning arm 19 may have a base 19*a* connected to the slider 23 and extending in the horizontal direction perpendicular to the vertical direction, and a mounting portion 19*b* connected to the base 19*a* and extending in the horizontal direction below the upper surface of the base 19*a* in the vertical direction, and in this case, the rear-side coating robot 9 may be installed in the mounting portion 19*b*.

For example, when coating a coating target (for example, a floor) below the interior of the vehicle body 15, if the rear-side coating robot 9 is installed at a high position, some of the arm elements of the rear-side coating robot 9 are likely to interfere with the upper portion of the vehicle body 15. In the present embodiment, the rear-side coating robot 9 is installed in the mounting portion 19*b* extending to a position lower than the base 19*a* of the turning arm 19. As a result, the installation position of the rear-side coating robot 9 can be lowered, so that the lower coating target (for example, the floor 15*c*, etc.) inside the vehicle body 15 can be painted while avoiding interference between the rear-side coating robot 9 and the upper portion of the vehicle body 15.

In the embodiment, the base 33 of the rear-side coating robot 9 may be installed on the mounting portion 19*b* at a height between the placing surface 3*a* on which the vehicle body 15 of the conveyor 3 is placed and a coating target (for example, the floor 15*c* or the like) located at the lowest position in the vehicle body 15.

In this case, it is possible to prevent the arm element of the rear-side coating robot 9 from interfering with the upper portion of the vehicle body 15 even when coating the coating target (for example, the floor 15*c*) located at the lowermost position in the vehicle body 15.

In the embodiment, the turning arm 19 may be provided on the slider 23 so as to be turnable in a circumferential direction around the turning axis SAx within a predetermined angular range including an angle parallel to the front-rear direction.

In this case, when the vehicle body 15 is to be painted, the turning arm 19 is turned by a predetermined angle from an angle parallel to the front-rear direction toward the vehicle body 15 to move the rear-side coating robot 9 to an optimum coating position. Further, when the vehicle body 15 passes, the turning arm 19 is rotated at an angle parallel to the front-rear direction so as to be retracted, thereby avoiding interference with the vehicle body 15.

In the embodiment, the turning arm 19 may be installed on the slider 23 so that the mounting portion 19*b* on which the rear-side coating robot 9 is mounted can be rotated in the direction away from the transport path of the vehicle body 15 from an angle parallel to the front-rear direction in the circumferential direction around the turning axis SAx.

For example, when the width of the rear-side coating robot 9 is larger than the width of the turning arm 19 and protrudes in the width direction, even if the turning arm 19 is rotated at an angle parallel to the front-rear direction and is retracted, the protruding portion of the rear-side coating robot 9 may interfere with the transport path of the vehicle body 15. In order to avoid the interference, it is necessary to separate the turning axis SAx of the turning arm 19 from the transport path of the vehicle body 15, and in this case, the width dimension of the coating booth is increased. In this embodiment, by rotating the turning arm 19 from an angle parallel to the front-rear direction in the direction in which the mounting portion 19*b* separates from the transport path of the vehicle body 15, it is possible to avoid interference between the rear-side coating robot 9 and the transport path of the vehicle body 15 while bringing the turning axis SAx of the turning arm 19 closer to the transport path of the vehicle body 15. As a result, the width dimension of the coating booth can be reduced.

In the embodiment, the turning arm 19 may be configured such that the distance D1 between the turning axis SAx and the mounted rear-side coating robot 9 is substantially equal to the distance D2 between the turning axis SAx and the center position Cp of the vehicle body 15 in the left-right direction.

In this case, the rear-side coating robot 9 can be positioned at a substantially central position in the width direction of the vehicle body 15 by turning the turning arm 19 by approximately 90 degrees from an angle parallel to the front-rear direction. Thus, when the rear-side coating robot 9 accesses the interior of the vehicle body 15 through, for example, the rear back door 15*a* of the vehicle body 15, coating can be performed while avoiding interference with the left and right wall portions 15*e* portions 15*e* and 15*f* of the vehicle body 15.

In the embodiment, the conveyor 3 may continuously convey the vehicle body 15 in the front-rear direction, and in this case, the host controller 109 or the like may control at least one of the traveling device 17 and the turning arm 19 so that the rear-side coating robot 9 or the front coating robot 13 follows the vehicle body 15.

In this embodiment, since coating is performed by causing the rear-side coating robot 9 or the front-side coating robot 13 to follow the vehicle body 15 continuously conveyed by the conveyor 3, the tact time can be shortened compared with the case where coating is performed while the vehicle body 15 is stopped. Further, by causing the rear-side coating robot 9 or the front-side coating robot 13 to follow the vehicle body 15, it is possible to use teaching data performed while the vehicle body 15 is stopped. As a result, the teaching operation to the rear-side coating robot 9 or the front coating robot 13 becomes easy.

In the embodiment, the host controller 109 or the like may control the horizontal arm 41 so that the vertical mill 43 of the rear-side opening/closing robot 7 follows the vehicle body 15.

In this embodiment, the operation of the horizontal arm 41 of the rear-side opening/closing robot 7 is controlled so that the vertical arm 43 (the hook 29) follows the continuously conveyed vehicle body 15. As a result, the back door 15*a* can be kept open with respect to the vehicle body 15 which is continuously conveyed without providing the moving device.

In the embodiment, when the rear-side coating robot 9 is retracted from the transfer path of the vehicle body 15, the host controller 109 or the like may rotate the turning arm 19 so that the mounting portion 19*b* on which the rear-side coating robot 9 is mounted moves upstream in the transfer direction of the vehicle body 15.

If the rear-side coating robot 9 is retracted from the transfer path of the vehicle body 15 by rotating the turning arm 19 so that the mounting portion 19*b* on which the rear-side coating robot 9 is mounted moves downstream in the transfer direction of the vehicle body 15, the turning arm 19 is rotated after the rear end of the vehicle body 15 has passed the tip of the turning arm 19 facing downstream, thereby reducing the follow-up distance. In this embodiment, the turning arm 19 is rotated so that the mounting portion 19*b* on which the rear-side coating robot 9 is mounted moves to the upstream side in the conveying direction of the vehicle body 15, and the rear-side coating robot 9 is retracted from the conveying path of the vehicle body 15. As a result, it is possible to start turning of the turning arm 19 after the rear end of the vehicle body 15 passes through the front end of the turning arm 19 facing the upstream side, so that a follow-up distance can be secured. Therefore, high-quality coating can be performed.

A coating system 1 comprises a conveyor 3 for conveying a vehicle body 15 in the front-rear direction, a rear-side opening/closing robot 7 provided with a base 31 fixed to a structure constituting a coating booth and opening a back door 15*a* behind the vehicle body 15, a rear-side coating robot 9 provided with a base 33 disposed vertically below the base 31 and coating the interior of the vehicle body 15 the back door 15*a* opened by the rear-side opening/closing robot 7, a front-side opening/closing robot 11 provided with a base 37 fixed to the structure and opening a side door 15*b* on the side of the vehicle body 15, a front-side coating robot 13 provided with a base 39 disposed vertically below the base 37 and coating the interior of the vehicle body 15 via the side door 15*b* opened by the front-side opening/closing robot 11, a traveling device 17 for traveling a slider 23, 25 in the front-rear direction on the same rail 21, and a turning min 19 installed on the slider 23 and turning around a turning axis SAx along the vertical direction, wherein the rear-side coating robot 9 is mounted on the turning arm 19, and the front-side coating robot 13 is mounted on a slider 25.

In the coating system 1 of the present embodiment, since the back door 15*a* at the rear of the vehicle body 15 and the side door 15*b* at the side of the vehicle body 15 can be opened well, it is possible to secure an operating area for the rear-side coating robot 9 and the front coating robot 13 to paint the interior of the vehicle body 15, and it is possible to perform high-quality coating. Also, by making the height positions of the rear-side opening/closing robot 7 and the rear-side coating robot 9 and the height positions of the front-side opening/closing robot 11 and the front-side coating robot 13 different from each other, it is possible to avoid interference between the operating area 91 of the rear-side opening/closing robot 7 and the operating area 85 of the rear-side coating robot 9 and between the operating area 95 of the front-side opening/closing robot 11 and the operating area 93 of the front-side coating robot 13, and it is possible to secure the operating areas of the respective robots. Furthermore, since the rear-side opening/closing robot 7 and the front-side opening/closing robot 11 arranged above are fixed to the structure, it is not necessary to install the moving device for the rear-side opening/closing robot 7 and the moving device for the front-side opening/closing robot 11, which are heavy objects, on the ceiling or wall of the coating booth, and it is not necessary or simple to reinforce the ceiling or wall. Further, since the rear-side coating robot 9 and the front coating robot 13 are mounted on the same rail 21, the size of the coating booth in the width direction can be reduced.

12. Modified Example

The disclosed embodiments are not limited to the above, and various modifications may be made without departing from the spirit and technical concept thereof. Such a modified example will be described below.

12-1. When Using an Arm Reverse Mounting Type Coating Robot

Figure 14:
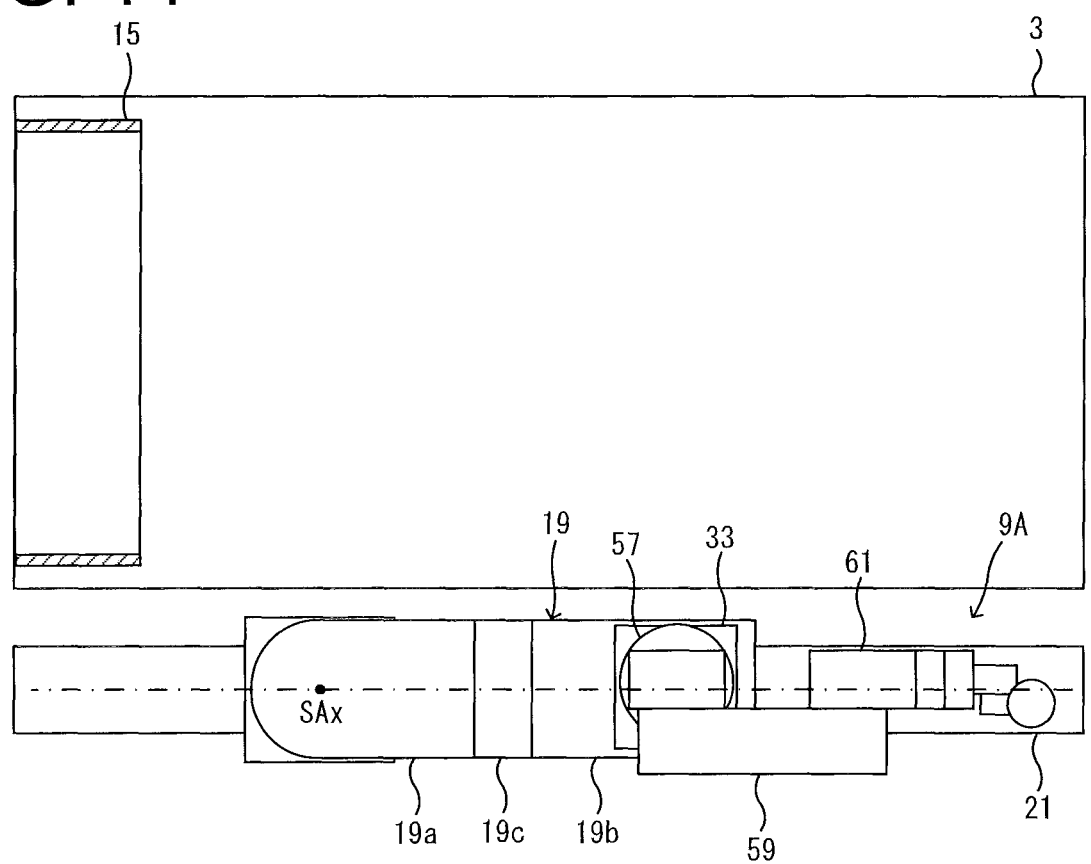
FIG. 14 is a top view showing an example of a turning angle of a turning arm in a modification using an arm reverse mounting type coating robot.

In the above-described embodiment, the lower arm 59 of the rear-side coating robot 9 is prevented from interfering with the conveyance path of the vehicle body 15 by rotating the turning arm 19 in the direction in which the mounting portion 19*b* is separated from the conveyor 3 from an angle parallel to the front-rear direction (angle θ is approximately 0 degrees). For example, as shown in FIG. 14, a rear-side coating robot 9A of an arm reverse mounting type may be used, in which a lower arm 59 is connected to a side portion of the turning portion 57 opposite to the rear-side coating robot 9, that is, to a side portion of the turning portion 57 on the other side (lower side in the example shown in FIG. 14). In this case, as shown in FIG. 14, the lower arm 59 of the rear-side coating robot 9 can be prevented from interfering with the conveyance path of the vehicle body 15 even in a state where the turning arm 19 is turned at an angle parallel to the front-rear direction, for example.

12-2. When Coating from Both Sides of Vehicle Body

Figure 15:
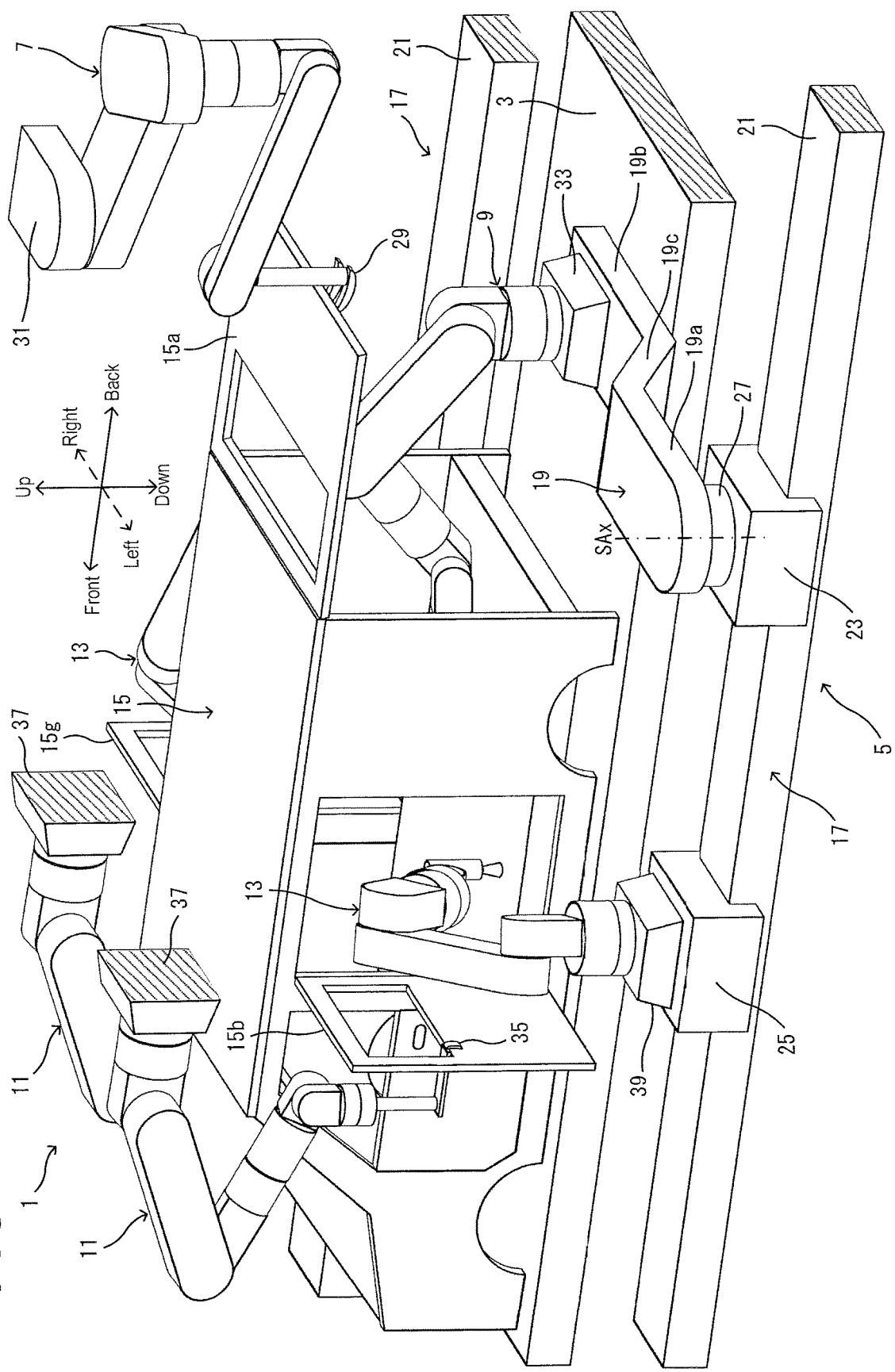
FIG. 15 is a perspective view showing an example of the overall configuration of a coating system in a modification in which coating is performed from both sides of a vehicle body.

In the above-described embodiment, the case where the vehicle body 15 has the side door 15b on the left side has been described, but the present invention is not limited thereto. For example, as shown in FIG. 15, the vehicle body 15 may have side doors 15b and 15g on both sides in the left-right direction. In this case, as shown in FIG. 15, when the front-side opening/closing robot 11 and the front coating robot 13 are set as one set, one set (two sets in total) of the front opening/closing robots 11 and the front coating robots 13 may be arranged on both sides of the transport path of the vehicle body 15 in the left-right direction. In this modified example, the traveling device 17 is installed not only on the left side of the conveyor 3 but also on the right side, and the front-side coating robot 13 disposed on the right side of the vehicle body 15 is moved in the front-rear direction along the rail 21 by the traveling device 17. Similarly to the front-side opening/closing robot 11 disposed on the left side of the vehicle body 15, the front-side opening/closing robot 11 disposed on the right side of the vehicle body 15 has a base 37 fixed to a wall or a ceiling constituting the coating booth and does not move with respect to the wall or the ceiling. The pair of left and right front-side opening/closing robots 11 are arranged in line symmetry, for example, around the conveying path (conveyor 3) of the vehicle body 15.

The front-side opening/closing robot 11 disposed on the right side of the vehicle body 15 opens the side door 15g of the vehicle body 15 by using the hook 35. The front-side opening/closing robot 11 changes the posture so that the hook 35 follows the vehicle body 15 and keeps the side door 15g open. The front-side coating robot 13 disposed on the right side of the vehicle body 15 accesses the inside of the vehicle body 15 from the right side through a side door 15g opened by the front-side opening/closing robot 11, and paints the inside of the vehicle body 15.

According to this modification, the side doors 15b and 15g provided on both sides of the vehicle body 15 in the width direction are opened and held, respectively, so that coating can be executed simultaneously and in parallel from both left and right sides of the vehicle body 15. Therefore, the tact time can be shortened as compared with the case where coating is performed from one side of the vehicle body 15 in the left-right direction.

12-3. Case Where the Operating Area of the Open-Close Robot and the Coating Robot is Separated Vertically In the above-described embodiment, the operating areas of the rear-side opening/closing robot 7 and the rear-side coating robot 9 and the operating areas of the front-side opening/closing robot 11 and the front-side coating robot 13 are configured to overlap in the vertical direction.

Figure 16:
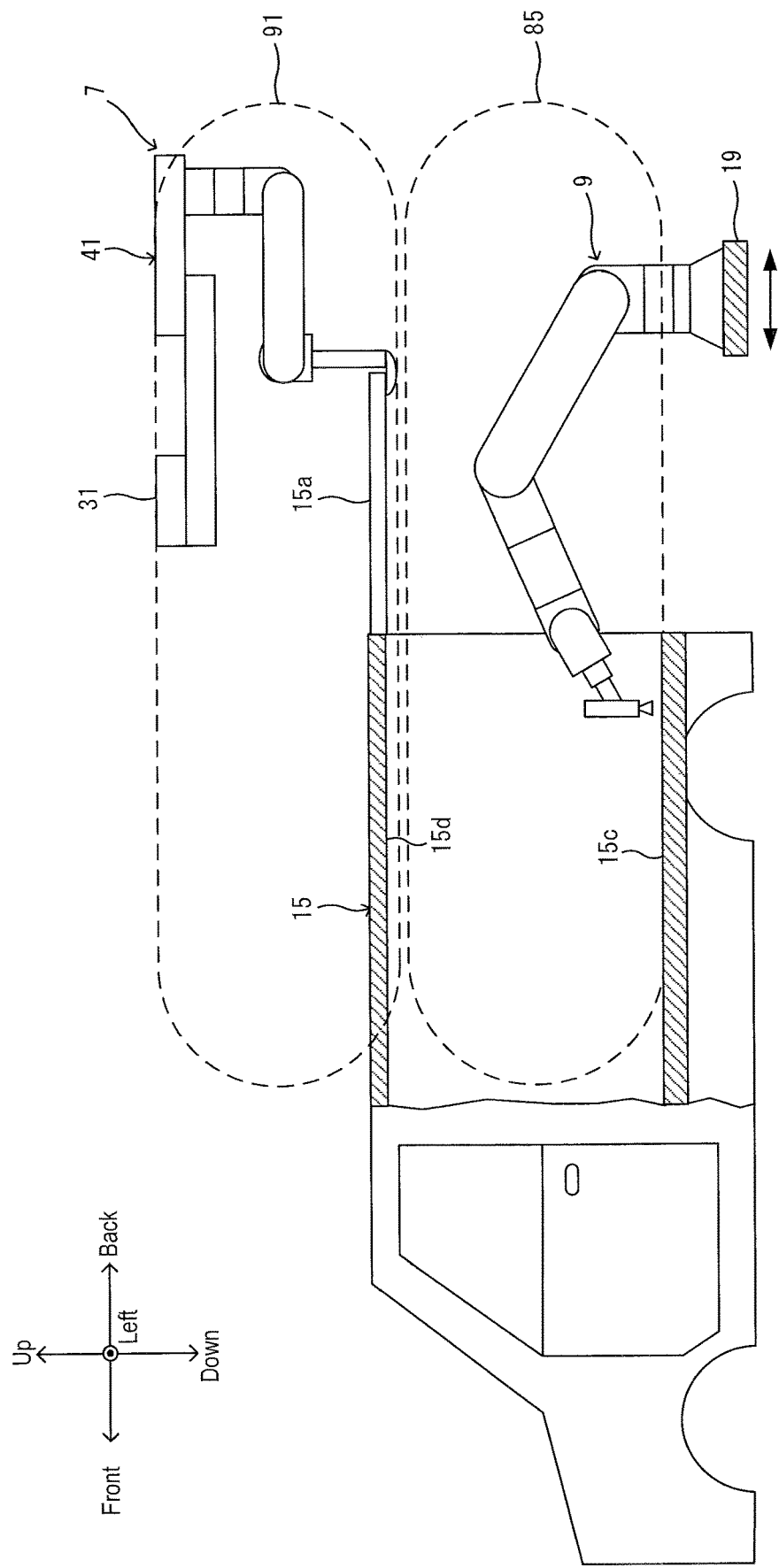
FIG. 16 is a side view showing a modified example in which the operating areas of the rear-side opening/closing robot and the rear-side coating robot are configured so as not to overlap in the vertical direction.
Figure 17:
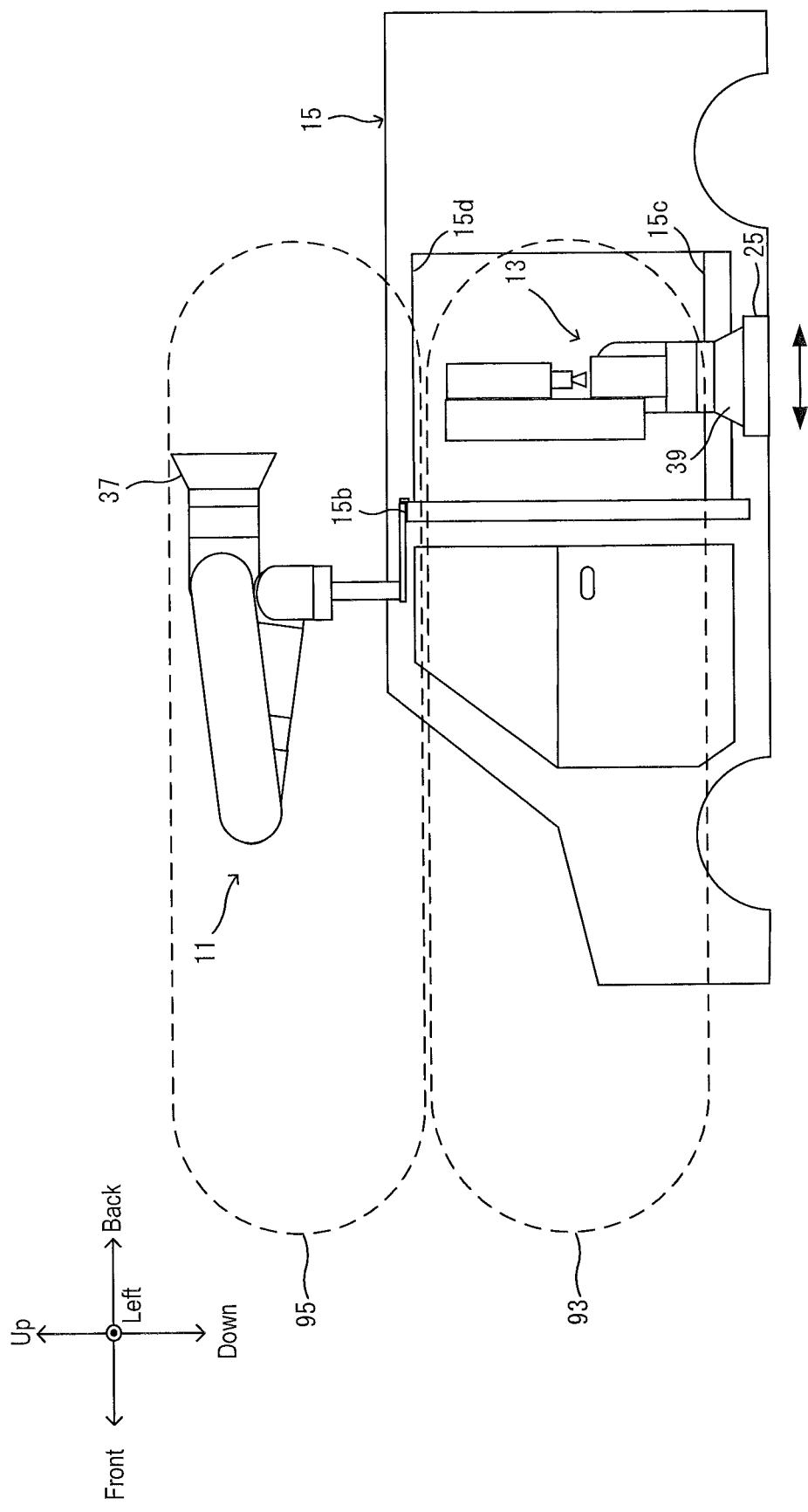
FIG. 17 is a side view showing a modified example in which the operating areas of the front-side opening/closing robot and the front-side coating robot are configured not to overlap in the vertical direction.

FIGS. 16 and 17 show an example of an operating area of the rear-side opening/closing robot 7 and the rear-side coating robot 9, and an operating area of the front-side opening/closing robot 11 and the front-side coating robot 13 in this variation. For example, as shown in FIG. 16, the range of the operating area 91 of the rear-side opening/closing robot 7 in the vertical direction may be, for example, a range from the vicinity of the base 31 to the vicinity of the lower end of the back door 15a of the vehicle body 15 in the opened state. In this case, the back door 15a may be opened by, for example, an operator or another machine, and the rear-side opening/closing robot 7 may be maintained in an open state.

In this variation, at least a part of the operating area 91 of the rear-side opening/closing robot 7 and the operating area 85 of the rear-side coating robot 9 overlap in the front-rear and left-right directions when viewed from the vertical direction. The operating area 85 of the rear-side coating robot 9 is located below the base 31 of the rear-side opening/closing robot 7 in the vertical direction. The operating area 85 of the rear-side coating robot 9 is located below the operating area 91 of the rear-side opening/closing robot 7 in the vertical direction.

For example, as shown in FIG. 17, the range of the operating area 95 of the front-side opening/closing robot 11 in the vertical direction may be, for example, a range from the vicinity of the base 37 to the vicinity of the upper end of the side door 15b of the vehicle body 15. In this case, the front-side opening/closing robot 11 may be configured to hold, for example, the upper end of the side door 15b by the hook 35.

In this variation, at least a part of the operating area 95 of the front-side opening/closing robot 11 and the operating area 93 of the front-side coating robot 13 overlap with each other in the front-to-back and left-to-right directions when viewed from the vertical direction. In addition, the operating area 93 of the front coating robot 13 is located below the base 37 of the front-side opening/closing robot 11 in the vertical direction. The operating area 93 of the front-side coating robot 13 is located below the operating area 95 of the front-side opening/closing robot 11 in the vertical direction.

According to this modification, the operating area 91 of the rear-side opening/closing robot 7 and the operating area 85 of the rear-side coating robot 9 can be prevented from interfering with each other, and the operating area of each robot can be secured. Thus, the rear-side opening/closing robot 7 can perform the operation of opening the back door 15a without being affected by the operation of the rear-side coating robot 9, and the rear-side coating robot 9 can perform the coating operation without being affected by the operation of the rear-side opening/closing robot 7. Therefore, high-quality coating can be performed. Further, the operating area 95 of the front-side opening/closing robot 11 and the operating area 93 of the front-side coating robot 13 can be prevented from interfering with each other, and the operating area of each robot can be secured. Thus, the front-side opening/closing robot 11 can execute the opening operation of the side door 15b without being affected by the operation of the front-side coating robot 13, and the front-side coating robot 13 can execute the coating operation without being affected by the operation of the front-side opening/closing robot 11. Therefore, high-quality coating can be performed.

12-4. Case Where Controller for Turning Arm and Traveling Device is Provided In the above-described embodiment, the second robot controller 99 controls the turning arm 19 and the slider 23 of the traveling device 17 in addition to the rear-side coating robot 9, and the fourth robot controller 103 controls the slider 25 of the traveling device 17 in addition to the front-side coating robot 13. For example, controllers for the turning arm 19 and the traveling device 17 may be separately provided.

Figure 18:
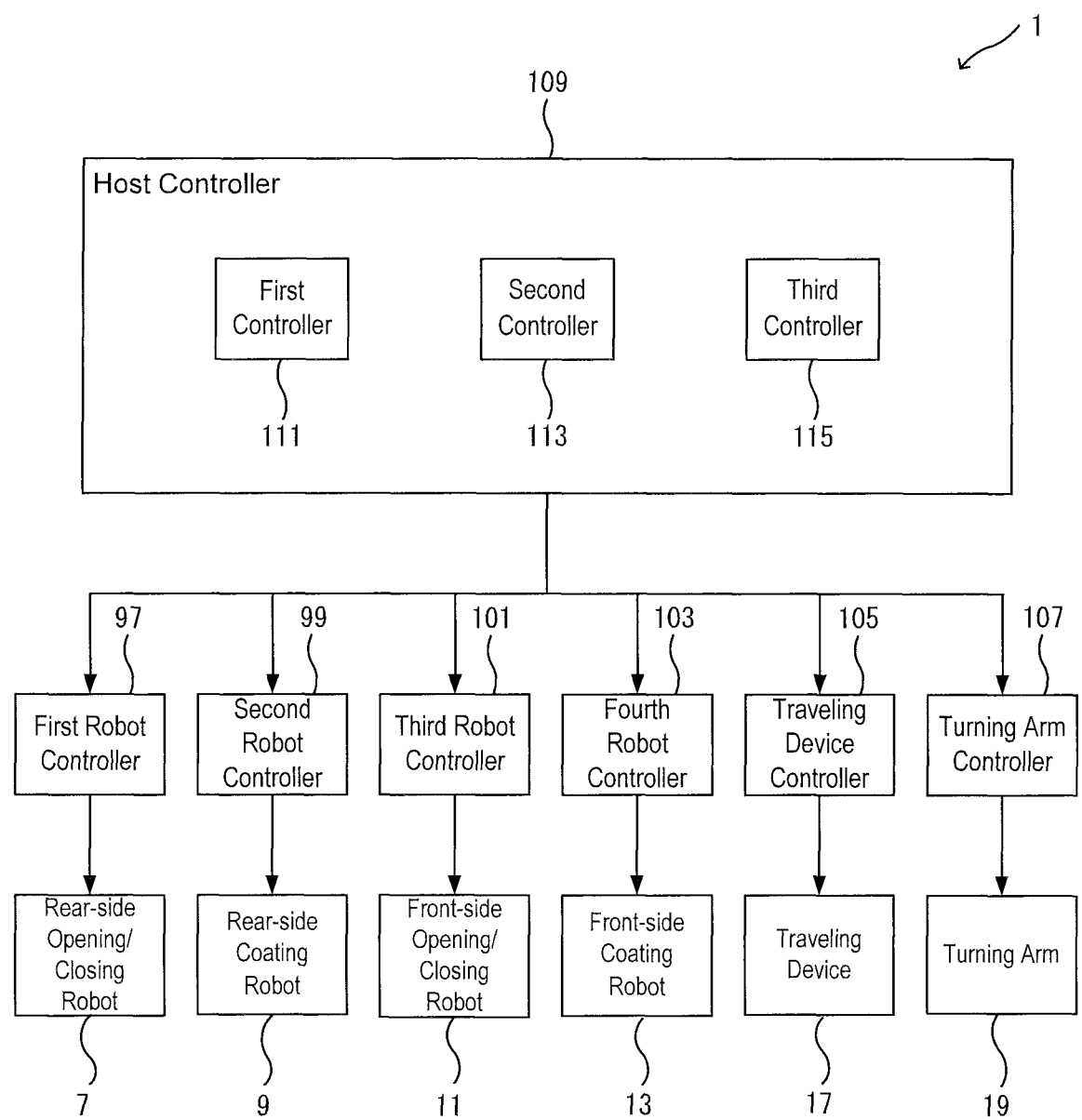
FIG. 18 is a block diagram showing an example of a control configuration of a coating system in a modification in which a controller for a traveling device and a turning arm is provided.

As shown in FIG. 18, the coating system 1 includes a traveling device controller 105 and a turning arm controller 107. The traveling device controller 105 calculates a target rotation angle or the like of each servo motor of each actuator necessary for moving the position of each slider 23, 25 to a desired position based on a command (for example, a position command or the like) input from the host controller 109. The traveling device controller 105 controls the drive power supplied to each servo motor of each actuator based on the motor position command corresponding to the calculation result, the detection value of each encoder of each servo motor, and the like, and independently controls the position of each slider 23, 25.

The turning arm controller 107 calculates, based on a command (for example, a position command) input from the host controller 109, a target rotation angle or the like of the servo motor of the actuator 27 necessary for rotating the turning arm 19 to a desired rotation angle. The turning arm controller 107 controls the drive power to be supplied to the servo motor of the actuator 27 based on the motor position command corresponding to the calculation result and the detection value of the encoder of the servo motor, thereby controlling the turning operation of the turning arm 19. Also in this modified example, the same effect as that of the above embodiment can be obtained.

12-5. Others

In the above-described embodiment, the case where the vehicle body 15 has both the back door 15*a* that opens and closes in the vertical direction and the side door 15*b* that opens and closes in the horizontal direction has been described, but the type of the vehicle body 15 to be painted is not limited to the above. For example, when the vehicle body 15 has only a door that opens and closes in the vertical direction, the above-described coating system 1 may be applied. For example, when the vehicle body 15 has only a door that opens and closes in a horizontal direction, the above-described coating system 1 may be applied. Further, for example, when the vehicle body 15 has an opening/closing portion which opens and closes in the vertical or horizontal direction on the front-side thereof, the turning arm 19 may be turned in front of the vehicle body 15 so that the coating robot accesses the interior of the vehicle body 15 from the front-side thereof for coating.

13. Hardware Configuration Example of Controller

Next, referring to FIG. 19, an example of the hardware configuration of the host controller 109 described above will be described.

Figure 19:
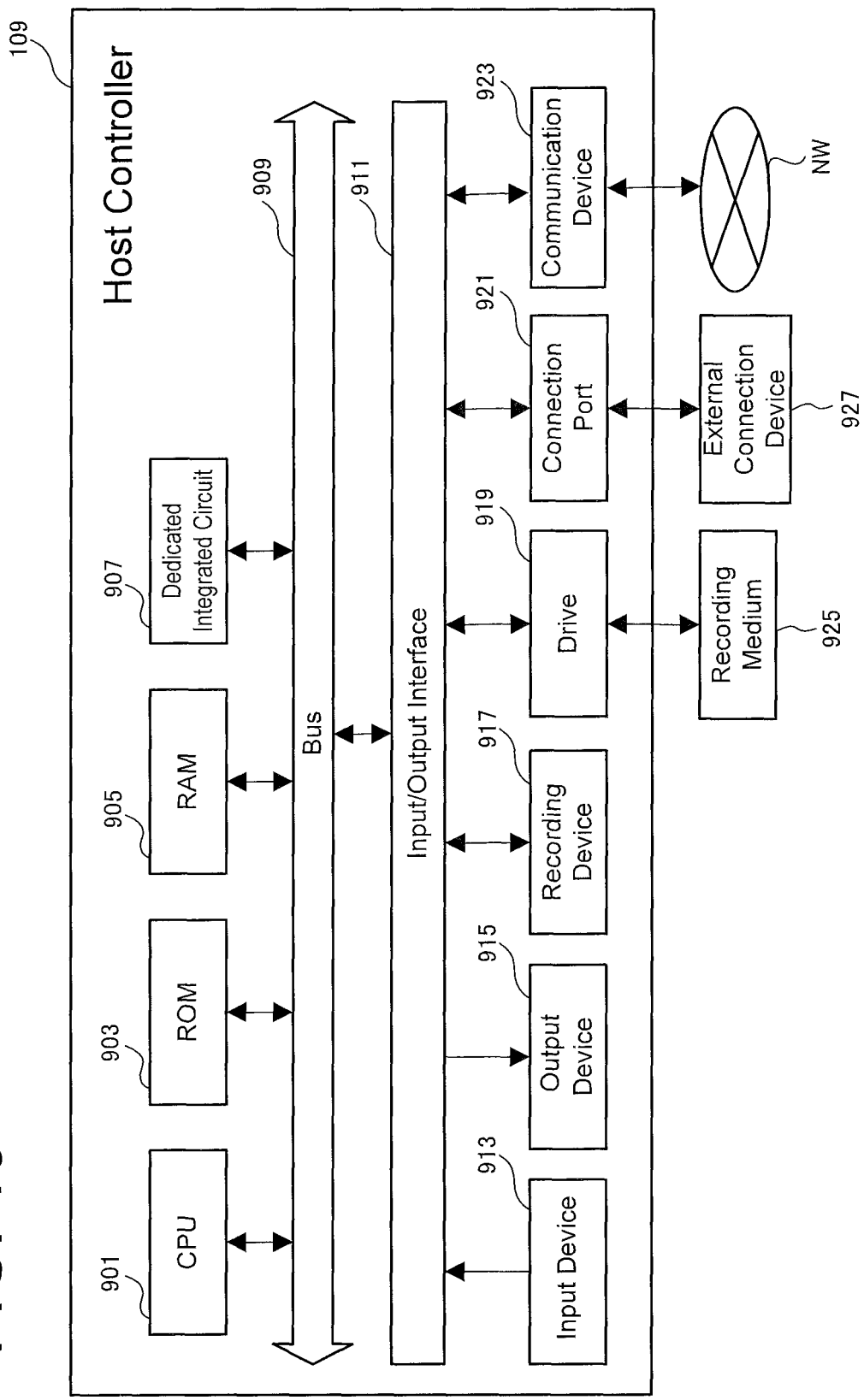
FIG. 19 is a block diagram showing an example of a hardware configuration of a host controller.

As shown in FIG. 19, the host controller 109 includes, for example, a CPU901, a ROM903, a RAM905, a dedicated integrated circuit 907 constructed for a specific application such as an ASIC or an FPGA, an input device 913, an output device 915, a recording device 917, a drive 919, a connection port 921, and a communication device 923. These components are connected to each other through a bus 909 and an input/output interface 911 so that signals can be transmitted to each other.

The program, the program can be recorded in a recording device 917 or the like including a ROM903, a RAM905, a hard disk or the like.

The program may be temporarily or non-temporarily (permanently) recorded on a magnetic disk such as a flexible disk, an optical disk such as a CD, MO disk, DVD, or a removable recording medium 925 such as a semiconductor memory. Such a recording medium 925 can also be provided as so-called package software. In this case, the program recorded on the recording medium 925 may be read out by the drive 919 and recorded in the recording device 917 via the input/output interface 911, the bus 909, or the like.

The program may be recorded in, for example, a download site, another computer, another recording device, or the like (not illustrated). In this case, the program is transferred via a network NW such as a LAN or the Internet, and the communication device 923 receives the program. The program received by the communication device 923 may be recorded in the recording device 917 via the input/output interface 911, the bus 909, or the like.

Further, the program may be recorded in an appropriate external connection device 927, for example. In this case, the program may be transferred through an appropriate connection port 921 and recorded in the recording device 917 through an input/output interface 911, a bus 909, or the like.

Then, the CPU901 executes various processes according to the program recorded in the recording device 917, thereby realizing the processes by the first control unit 111, the second control unit 113, the third control unit 115, and the like. At this time, for example, the CPU901 may directly read the program from the recording device 917 and execute it, or may temporarily load it into the RAM905 and execute it. Furthermore, for example, when the CPU901 receives a program via the communication device 923, the drive 919, or the connection port 921, the CPU901 may directly execute the received program without recording it in the recording device 917.

The CPU901 may perform various processes based on signals or information input from an input device 913 such as a mouse, keyboard, microphone, or touch panel (not shown) as needed.

Then, the CPU901 may output the result of executing the above-described processing from an output device 915 such as a display device or an audio output device, and the CPU901 may transmit the processing result via the communication device 923 or the connection port 921 as necessary, or may record the processing result in the recording device 917 or the recording medium 925.

In the above description, when there are descriptions such as "vertical", "parallel" and "plane", these descriptions are not strictly defined. That is, the terms "vertical", "parallel" and "plane" mean "substantially vertical", "substantially parallel" and "substantially plane", where tolerances and errors in design and manufacturing are allowed.

In addition, in the above description, when there are statements such as "identical", "similar", "equal", "different", etc. in terms of dimensions, size, shape, position, etc. in appearance, these statements are not strict. That is, the terms "identical", "similar", "equal", and "different" mean "substantially identical", "substantially similar", "substantially equal", and "substantially different", while tolerances and errors in design and manufacturing are allowed.

In addition to the above description, techniques according to the above-described embodiments and variations may be used in combination as appropriate. In addition, although not illustrated individually, various modifications may be made to the above-described embodiments and modifications without departing from the spirit thereof.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A coating system comprising:
    a conveyor configured to convey a vehicle body in a first direction;
    a first robot configured to open an opening/closing portion of the vehicle body and having a first base via which the first robot is mounted to a structure forming a coating space;
    a second robot configured to coat an interior of the vehicle body through the opening/closing portion opened by the first robot and having a second base via which the second robot is mounted, the second base being mounted lower than the first base in a vertical direction;
    a moving device configured to move the second robot in the first direction and in a second direction intersecting the first direction, the moving device comprising:
        a traveling device comprising a slider movable in the first direction; and
        a turning arm connected to the slider rotatable around a turning axis which is along the vertical direction, the second base of the second robot being mounted on the turning arm; and
    a control circuitry configured to move the slider and rotate the turning arm according to a position of a coating area in the interior of the vehicle body so that the second robot coats the coating area.

2. The coating system according to claim 1, wherein the first robot comprises:
    a horizontal arm having a base end and a tip end opposite to the base end, the base end being connected to the first base; and
    a vertical arm that is connected to the tip end of the horizontal arm and configured to hold the opening/closing portion.

3. The coating system according to claim 2,
    wherein the horizontal arm includes a plurality of arms which include an arm connected to the first base rotatably around a rotation axis extending along the vertical direction, and
    wherein the plurality of arms are connected to each other rotatably around a rotation axis extending along the vertical direction.

4. The coating system according to claim 2, wherein the vertical arm comprises:
    at least one arm having a first end and a second end opposite to the first end, the first end being connected to the tip end of the horizontal arm rotatably around a rotation axis extending along a direction substantially perpendicular to the vertical direction; and
    holding portion which is connected to the second end of the at least one arm and which is configured to hold the opening/closing portion.

5. The coating system according to claim 2,
    wherein the horizontal arm has a vertical rotation axis which extends along the vertical direction and around which the horizontal arm is rotatable, and
    wherein the vertical arm has a horizontal rotation axis which extends along a direction perpendicular to the vertical direction and around which the vertical arm is rotatable.

6. The coating system according to claim 1, wherein the second robot comprises:
    a first arm;
    a second arm; and
    a joint via which the first arm and the second arm are connected rotatably about a rotation axis such that an angle between the first arm and the second arm is smaller or larger than 180 degrees.

7. The coating system according to claim 1, wherein the turning arm comprises:
    a base connected to the slider and extending in a direction substantially perpendicular to the vertical direction; and
    a mounting portion connected to the base and positioned below an upper surface of the base in the vertical direction, the second base of the second robot being mounted on the mounting portion.

8. The coating system according to claim 7,
    wherein the second base of the second robot is mounted on the mounting portion at a height between a placing surface of the conveyor on which the vehicle body is placed and a coating target located at a lowermost position in the vehicle body.

9. The coating system according to claim 1, wherein the turning arm is rotatable around the turning axis within a predetermined angular range including an orientation parallel to the first direction.

10. The coating system according to claim 9, wherein the turning arm is connected to the slider so that a mounting portion on which the second robot is mounted is turned in a direction away from the vehicle body from an angle parallel to the first direction in a circumferential direction around the turning axis.

11. The coating system according to claim 1, wherein a distance between the turning axis and the second robot is substantially equal to a distance between the turning axis and a center position of the vehicle body in the second direction.

12. The coating system according to claim 1, wherein the control circuitry is configured to control at least one of the traveling device and the turning arm such that the second robot follows the vehicle body.

13. The coating system according to claim 1, wherein the first robot comprises:
- a horizontal arm having a base end and a tip end opposite to the base end, the base end being connected to the first base; and
- a vertical arm that is connected to the tip end of the horizontal arm and configured to hold the opening/closing portion, and
- wherein the control circuitry is configured to control the horizontal arm so that the vertical arm follows the vehicle body.

14. The coating system according to claim 1, wherein the control circuitry is configured to turn the turning arm so that a mounting portion on which the second robot is mounted moves toward an upstream side in the first direction of the vehicle body when the second robot is retracted from a transfer path of the vehicle body.

15. The coating system according to claim 1, wherein the first base is mounted to the structure such that the base does not move with respect to the structure.

16. The coating system according to claim 1, further comprising:
- a third robot configured to open a second opening/closing portion provided on a side of the vehicle body and having a third base via which the third robot is mounted to the structure and which does not move with respect to the structure; and
- a fourth robot configured to coat the interior of the vehicle body through the second opening/closing portion opened by the third robot and having a fourth base that is mounted below the third base in the vertical direction.

17. The coating system according to claim 16,
- wherein the vehicle body includes the second opening/closing portions on both sides in a second direction intersecting with the first direction, and
- wherein a first combined robot of the third robot and the fourth robot is disposed on one side with respect to the transport path, a second combined robot of the third robot and the fourth robot is disposed on another side opposite to the one side with respect to the transport path.

18. A coating system comprising:
- a first robot configured to open an opening/closing portion of a vehicle body and having a first base via which the first robot is mounted to a structure forming a coating space;
- a second robot configured to coat an interior of the vehicle body through the opening/closing portion opened by the first robot and having a second base via which the second robot is mounted, the second base being mounted lower than the first base in a vertical direction;
- a conveyor configured to convey the vehicle body in a first direction; and
- a moving device configured to move the second robot in the first direction and in a second direction intersecting the first direction,
- wherein the moving device comprises:
  - a traveling device comprising a slider movable in the first direction; and
  - a turning arm connected to the slider rotatable around a turning axis which is along the vertical direction, the second base of the second robot being mounted on the turning arm, and
- wherein the second robot is a vertical multi-joint robot including the second base and a turning portion that is connected to an upper end portion of the second base in the vertical direction.

19. The coating system according to claim 18, further comprising:
- a third robot configured to open a second opening/closing portion provided on a side of the vehicle body and having a third base via which the third robot is mounted to the structure and which does not move with respect to the structure; and
- a fourth robot configured to coat the interior of the vehicle body through the second opening/closing portion opened by the third robot and having a fourth base that is mounted below the third base in the vertical direction.

20. The coating system according to claim 18,
- wherein the turning portion of the vertical multi-joint robot is connected to the upper end portion of the second base so as to be rotatable about a rotation axis parallel to the vertical direction, and
- wherein the vertical multi-joint robot is a six-axis robot.

21. A coating method comprising:
- conveying a vehicle body with an opening/closing portion in a first direction;
- controlling a horizontal arm of a first robot so that a vertical arm of the first robot follows the vehicle body, the vertical arm being connected to a tip end of the horizontal arm;
- opening the opening/closing portion via the vertical arm to maintain an open state;
- moving, using a moving device, a second robot in the first direction and in a second direction intersecting the first direction so as to follow the vehicle body, the moving device comprising:
  - a traveling device comprising a slider movable in the first direction; and
  - a turning arm connected to the slider rotatable around a turning axis which is along a vertical direction, a second base of the second robot being mounted on the turning arm; and
- coating an interior of the vehicle body with the second robot through the opened opening/closing section, wherein the slider is moved and the turning arm is rotated according to a position of a coating area in the interior of the vehicle body so that the second robot coats the coating area.

* * * * *